US008854947B2

(12) United States Patent
Jackson et al.

(10) Patent No.: US 8,854,947 B2
(45) Date of Patent: Oct. 7, 2014

(54) DEVICE AND METHOD FOR MONITORING A COMMUNICATIONS SYSTEM

(75) Inventors: David Jackson, Manlius, NY (US); Noah Montena, Syracuse, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 758 days.

(21) Appl. No.: 12/646,282

(22) Filed: Dec. 23, 2009

(65) Prior Publication Data

US 2010/0315942 A1 Dec. 16, 2010

Related U.S. Application Data

(60) Provisional application No. 61/187,224, filed on Jun. 15, 2009.

(51) Int. Cl.
*H04J 1/16* (2006.01)
*H04L 12/46* (2006.01)
*H04N 7/10* (2006.01)

(52) U.S. Cl.
CPC ............ *H04L 12/4625* (2013.01); *H04N 7/102* (2013.01)
USPC ............ 370/216; 725/125; 725/127; 725/107

(58) Field of Classification Search
USPC ......... 370/216, 217, 218, 229, 230, 235, 252, 370/220, 219; 725/125, 107, 127, 13, 106, 725/128, 121, 124, 118, 141; 455/3.04, 455/3.01, 62; 340/635, 568.1, 568.4, 572.7, 340/596; 348/194, 187
See application file for complete search history.

(56) References Cited

U.S. PATENT DOCUMENTS

| | | |
|---|---|---|
| 3,196,424 A | 7/1965 | Hardesty et al. |
| 3,388,590 A | 6/1968 | Bond |
| 3,686,623 A | 8/1972 | Nijman |
| 3,790,909 A | 2/1974 | LeFevre |
| 4,421,377 A | 12/1983 | Spinner |
| 4,489,419 A | 12/1984 | Wang |
| 4,512,033 A | 4/1985 | Schrock |
| 4,648,123 A | 3/1987 | Schrock |
| 4,677,390 A | 6/1987 | Wagner |
| 4,915,639 A | 4/1990 | Cohn et al. |

(Continued)

FOREIGN PATENT DOCUMENTS

| | | |
|---|---|---|
| EP | 0856993 | 8/1998 |
| EP | 0856993 A2 | 8/1998 |

(Continued)

OTHER PUBLICATIONS

PCT/US2010/038450 International Search Report and Written Opinion. Date of Mailing: Dec. 27, 2010. 8 pp.

*Primary Examiner* — Abdullah Riyami
(74) *Attorney, Agent, or Firm* — Hiscock & Barclay LLP

(57) ABSTRACT

Disclosed herein is a condition responsive device for connection with a communication system. The device includes a receiver configured to receive a physical parameter status signal from a connector of the communication system, the physical parameter status signal containing data pertaining to a condition of the connector connection. The device further includes a processing circuit configured to analyze the data to determine whether a communications signal adjustment is appropriate, wherein the processing circuit is configured to initiate a communications signal adjustment in the communication system if the processing circuit determines that adjustment is appropriate, based on a predetermined set of parameters.

56 Claims, 11 Drawing Sheets

(56) References Cited

U.S. PATENT DOCUMENTS

| | | | |
|---|---|---|---|
| 4,961,218 A | 10/1990 | Kiko | |
| 5,010,399 A | 4/1991 | Goodman et al. | |
| 5,169,329 A | 12/1992 | Taguchi | |
| 5,194,016 A | 3/1993 | Hatagishi et al. | |
| 5,214,505 A | 5/1993 | Rabowsky et al. | |
| 5,217,391 A | 6/1993 | Fisher, Jr. | |
| 5,225,816 A | 7/1993 | Lebby et al. | |
| 5,231,660 A | 7/1993 | West, Jr. | |
| 5,345,520 A | 9/1994 | Grile | |
| 5,355,883 A | 10/1994 | Ascher | |
| 5,462,450 A | 10/1995 | Kodama | |
| 5,490,033 A | 2/1996 | Cronin | |
| 5,518,420 A | 5/1996 | Pitschi | |
| 5,561,900 A | 10/1996 | Hosler, Sr. | |
| 5,839,052 A | 11/1998 | Dean et al. | |
| 5,893,024 A | 4/1999 | Sanders et al. | |
| 5,904,578 A | 5/1999 | Kubota et al. | |
| 5,924,889 A | 7/1999 | Wang | |
| 5,950,111 A | 9/1999 | Georger et al. | |
| 5,970,053 A | 10/1999 | Schick et al. | |
| 6,014,547 A | 1/2000 | Caporizzo et al. | |
| 6,069,960 A | 5/2000 | Mizukami et al. | |
| 6,093,043 A | 7/2000 | Gray et al. | |
| 6,130,703 A * | 10/2000 | Spriester et al. | 725/127 |
| 6,134,774 A | 10/2000 | Williams et al. | |
| 6,243,654 B1 | 6/2001 | Johnson et al. | |
| 6,348,955 B1 | 2/2002 | Tait | |
| 6,373,349 B2 | 4/2002 | Gilbert | |
| 6,377,316 B1 | 4/2002 | Mycynek et al. | |
| 6,425,132 B1 | 7/2002 | Chappell | |
| 6,449,250 B1 * | 9/2002 | Otani et al. | 370/219 |
| 6,495,998 B1 | 12/2002 | Terreault | |
| 6,570,373 B1 | 5/2003 | Viola | |
| 6,587,012 B1 | 7/2003 | Farmer et al. | |
| 6,618,515 B2 | 9/2003 | Kimura et al. | |
| 6,650,885 B2 | 11/2003 | Anderson et al. | |
| 6,678,893 B1 | 1/2004 | Jung | |
| 6,683,513 B2 | 1/2004 | Shamsaifar et al. | |
| 6,725,462 B1 | 4/2004 | Kaplan | |
| 6,728,968 B1 | 4/2004 | Abe et al. | |
| 6,755,681 B2 | 6/2004 | Chen | |
| 6,757,910 B1 | 6/2004 | Bianu | |
| 6,783,389 B1 | 8/2004 | Lee | |
| 6,845,232 B2 | 1/2005 | Darabi | |
| 6,877,166 B1 | 4/2005 | Roeck et al. | |
| 6,896,541 B2 | 5/2005 | Benson | |
| 6,928,175 B1 | 8/2005 | Bader et al. | |
| 7,003,275 B1 | 2/2006 | Petrovic | |
| 7,029,327 B2 | 4/2006 | Devine | |
| 7,039,432 B2 | 5/2006 | Strater et al. | |
| 7,162,731 B2 | 1/2007 | Reidhead et al. | |
| 7,254,511 B2 | 8/2007 | Niedzwiecki et al. | |
| 7,254,827 B1 * | 8/2007 | Terreault | 725/125 |
| 7,262,626 B2 | 8/2007 | Iwasaki | |
| 7,283,479 B2 | 10/2007 | Ljungdahl et al. | |
| 7,733,236 B2 * | 6/2010 | Montena et al. | 340/635 |
| 7,749,022 B2 | 7/2010 | Amidon et al. | |
| 7,760,711 B1 * | 7/2010 | Kung et al. | 370/352 |
| 7,850,482 B2 | 12/2010 | Montena et al. | |
| 7,909,637 B2 | 3/2011 | Montena | |
| 8,181,211 B2 * | 5/2012 | Olson et al. | 725/107 |
| 2001/0016950 A1 | 8/2001 | Matsuura | |
| 2002/0141347 A1 | 10/2002 | Harp et al. | |
| 2002/0144292 A1 | 10/2002 | Uemura et al. | |
| 2003/0096629 A1 | 5/2003 | Elliott et al. | |
| 2003/0140345 A1 | 7/2003 | Fisk et al. | |
| 2003/0142622 A1 * | 7/2003 | Kaku et al. | 370/208 |
| 2004/0028074 A1 * | 2/2004 | Huff et al. | 370/463 |
| 2004/0048567 A1 * | 3/2004 | Ohgami et al. | 455/11.1 |
| 2004/0139354 A1 * | 7/2004 | Jones et al. | 713/202 |
| 2004/0172659 A1 | 9/2004 | Ljungdahl et al. | |
| 2004/0174819 A1 * | 9/2004 | Liu et al. | 370/244 |
| 2004/0229561 A1 | 11/2004 | Cowley et al. | |
| 2004/0242220 A1 * | 12/2004 | Matsunaga | 455/423 |
| 2004/0252196 A1 * | 12/2004 | Englmeier | 348/192 |
| 2005/0034168 A1 | 2/2005 | Beveridge | |
| 2005/0141492 A1 * | 6/2005 | Chan | 370/355 |
| 2005/0183130 A1 | 8/2005 | Sadja et al. | |
| 2005/0204397 A1 * | 9/2005 | Miyazoe et al. | 725/107 |
| 2006/0281359 A1 * | 12/2006 | Nordin | 439/404 |
| 2006/0282871 A1 | 12/2006 | Yo | |
| 2007/0173367 A1 | 7/2007 | Duncan | |
| 2007/0288981 A1 | 12/2007 | Mitsuse et al. | |
| 2007/0288982 A1 | 12/2007 | Donahue | |
| 2007/0297346 A1 * | 12/2007 | Huisman et al. | 370/254 |
| 2008/0040764 A1 | 2/2008 | Weinstein et al. | |
| 2008/0127287 A1 | 5/2008 | Alkan et al. | |
| 2009/0007210 A1 * | 1/2009 | Nishide et al. | 725/125 |
| 2009/0031391 A1 | 1/2009 | Urbanek | |
| 2009/0081902 A1 | 3/2009 | Montena et al. | |
| 2009/0133095 A1 * | 5/2009 | Phillips et al. | 725/149 |
| 2009/0238349 A1 * | 9/2009 | Pezzutti | 379/93.02 |
| 2009/0280739 A1 * | 11/2009 | Saar et al. | 455/3.04 |
| 2010/0085062 A1 * | 4/2010 | Huang et al. | 324/534 |
| 2010/0158093 A1 * | 6/2010 | Thompson et al. | 375/227 |
| 2010/0178806 A1 | 7/2010 | Montena | |
| 2010/0180016 A1 | 7/2010 | Bugwadia et al. | |
| 2010/0194382 A1 | 8/2010 | Montena | |
| 2010/0211697 A1 * | 8/2010 | Raza et al. | 709/250 |
| 2010/0251314 A1 * | 9/2010 | Olson et al. | 725/107 |
| 2011/0069619 A1 * | 3/2011 | Voit et al. | 370/248 |
| 2011/0085452 A1 | 4/2011 | Kelma et al. | |
| 2011/0085480 A1 | 4/2011 | Kelma et al. | |
| 2011/0088077 A1 | 4/2011 | Kelma et al. | |

FOREIGN PATENT DOCUMENTS

| | | |
|---|---|---|
| KR | 20000029766 A | 5/2000 |
| KR | 1020000029766 | 5/2000 |
| KR | 1020040004525 | 1/2004 |
| WO | 0024124 A1 | 4/2000 |
| WO | 0172005 A1 | 9/2001 |
| WO | 0233969 A1 | 4/2002 |
| WO | 02091676 A1 | 11/2002 |
| WO | 2009042407 A2 | 4/2009 |
| WO | 2010117488 A1 | 10/2010 |

* cited by examiner

DEVICE AND METHOD FOR MONITORING A COMMUNICATIONS SYSTEM

CROSS-REFERENCE TO RELATED APPLICATIONS

This application is a non-provisional of, and claims the priority and benefit of, U.S. Provisional Patent Application No. 61/187,224 filed on Jun. 15, 2009.

FIELD OF THE INVENTION

The subject matter disclosed herein relates generally to communication systems. More particularly, this invention provides for a device that can be connected to a communication system for monitoring conditions of one or more connections of the system and responding to the monitored conditions.

BACKGROUND OF THE INVENTION

Communication systems typically include devices having ports or connection locations. Data or signals coming from or leaving the devices of the communication system must pass through these ports. Thus, ports are critical elements of any communication system. Ports are often connected to by a carrying media that is designed to transfer the data or signals to another device of the system. For example, in a wired network communication system, carrying media may be coaxial cable or optical fiber cable. The carrying media of a communication system often includes connectors for connecting the carrying media to the port of a system device.

There is a potential for many problems to arise in a communication system if there is a problem with a connection at a port of a system device. In a CATV communication system, for example, noise may enter the upstream from loose connectors or unterminated ports, causing problems for the head end or service provider. Additionally, the prevention and response to faulty or problematic connections may be of particular importance in situations where the devices of the system are substantially inaccessible, such as with deep sea devices or orbiting satellites.

Accordingly, a condition responsive device for connection with a communication system, and method of use thereof, would be well received in the art.

BRIEF DESCRIPTION OF THE INVENTION

According to one aspect of the invention, a condition responsive device for connection with a communication system comprises a receiver configured to receive a physical parameter status signal from a connector of the communication system, the physical parameter status signal containing data pertaining to a condition of the connector connection, and a processing circuit configured to analyze the data to determine whether a communications signal adjustment is appropriate, wherein the processing circuit is configured to initiate a communications signal adjustment in the communication system if the processing circuit determines that adjustment is appropriate, based on a predetermined set of parameters.

According to another aspect of the invention, a condition responsive device for connection with a communications system comprises a means for receiving a physical parameter status signal from a connector of the communication system, the physical parameter status signal containing data pertaining to a condition of the connector connection, a means for determining whether a response signal is appropriate, the response signal being appropriate if there is a problem in the connection of the connector with the port, and a means for sending the response signal to a device of the CATV system, the response signal initiating an alert generated by the device.

According to yet another aspect of the invention, a method of monitoring a communication system comprises receiving a physical parameter status signal from a connector of the communication system, the physical parameter status signal containing data pertaining to a condition of the connector connection, storing the data pertaining to the condition of the connector, determining whether a response signal is appropriate, the response signal being appropriate if there is a problem in the connection of the connector with the port, and transmitting the response signal to a device, the response signal configured to alert a party of the problem.

According to yet another aspect of the invention, a condition responsive device for connection with a communication system comprises a receiver configured to receive a physical parameter status signal from a connector of the communication system, the physical parameter status signal containing data pertaining to a condition of the connector connection, a storage unit configured to store the data, a processing circuit configured to analyze the data to determine whether a response signal is appropriate, the response signal being appropriate if there is a problem determined in the connection of the connector with the monitored port, and a transmitter configured to send the response signal to a device of the communication system, the response signal initiating an alert mechanism of the device.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
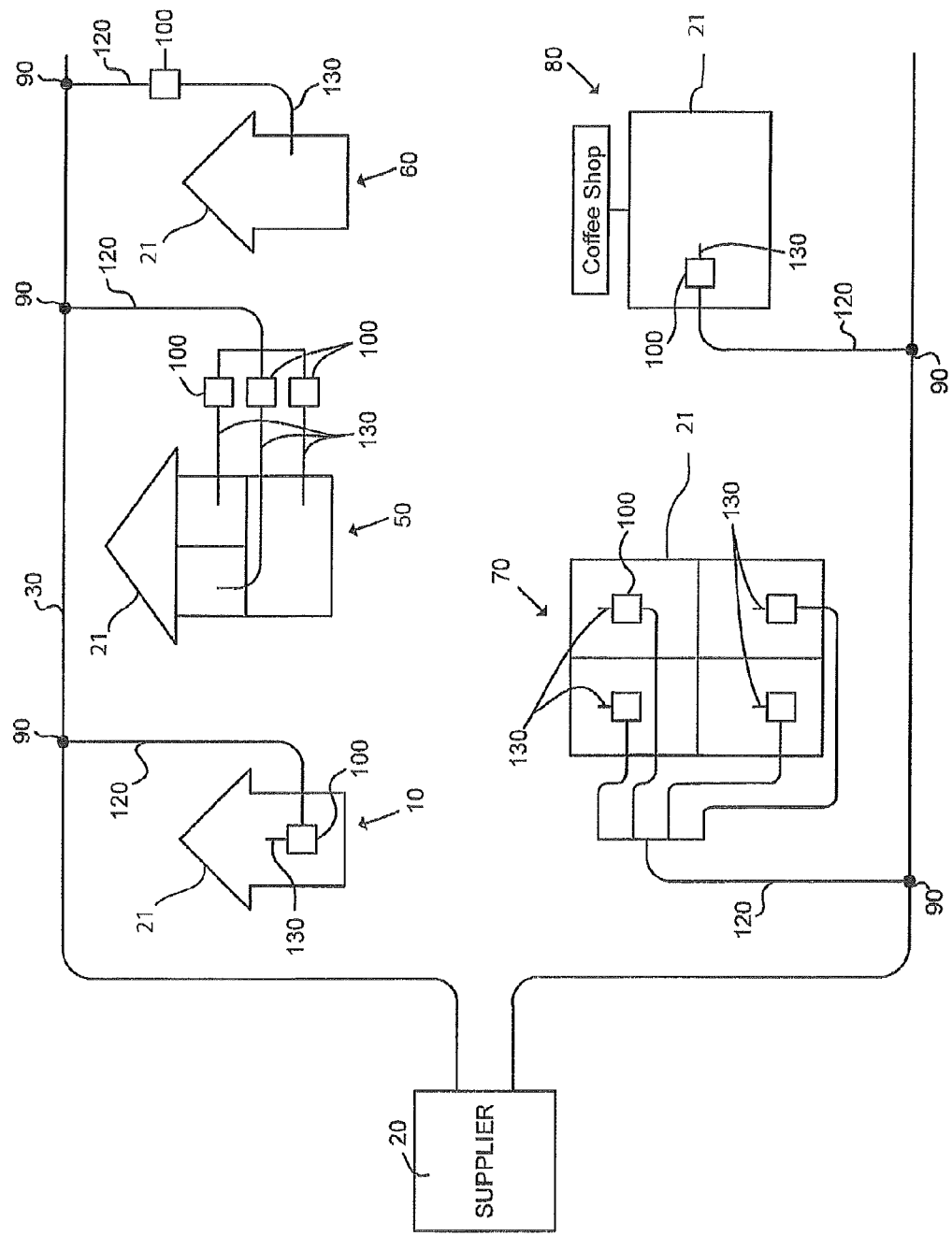
FIG. 1 depicts a coaxial cable communications system arranged in accordance with one embodiment of the present invention.

A detailed description of the hereinafter described embodiments of the disclosed apparatus and method are presented herein by way of exemplification and not limitation with reference to the Figures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring firstly to FIG. 1, a communication system is shown in the form of a cable communication system according to one aspect of the present invention. The cable communications system includes a supplier 20 that transmits downstream signals, such as radio frequency ("RF") signals, digital signals, electrical signals, or the like to a subscriber through a main signal distribution system 30 and receives upstream signals from a subscriber through the same main signal distribution system 30. It should be understood that the supplier 20 may also be referred to as the head end, the home office, and the like. A tap 90 may be located at the main signal distribution system 30 to allow for the passage of the downstream or upstream signals from or to the main signal distribution system 30. A drop transmission line 120 is then used to connect the tap to a subscriber 21 such as a house 10, 60, an apartment building 50, 70, a coffee shop 80, or other premise.

A condition responsive device 100 of the present invention is connected in series or in parallel between the drop transmission line 120 and a distribution system 130. The cable communication system and the distribution system 130 includes one or more connectors 12 (shown in FIGS. 3-8). The connectors 12 include sensors that may sense a variety of parameters associated with the connection, such as tightness, moisture, temperature, signal power level and the like. The connectors 12 also include transmitters for sending a physical parameter signal to the condition responsive device. As will be described in further detail herein below, the condition responsive device 100 is configured to receive a signal from one or more of the connectors 12 regarding one or more physical parameters of the connection. The condition responsive device 100 thereafter may be configured to analyze the signal based on a predetermined set of parameters, and respond to the signal appropriately.

It should be understood that a "communication system" herein refers to any electronic system having two or more devices that are in electronic communication. While the invention is described herein with respect to one application in a coaxial cable communication system, it is contemplated by the present invention that the same principles may be applied to other communications systems. For example, embodiments of the condition responsive device 100 may be applied to any type of communication system having connection nodes or ports such as an RJ-45 system or an optical communications system, a closed circuit security system, a wireless or radio system, a hydraulic actuator mechanical system, a vehicle system, military communications systems or the like.

Other applications of the invention that may be particularly useful include communication systems where the ports or connectors are not easily accessible. For instance, in deep sea systems or orbital systems if there is a problem stemming from a connection in the system, it may be extremely difficult to find due to the extreme environment in which the system is located. For example, in the case of a satellite, the condition responsive device 100 may be placed in communication with one or more of the connectors in order to monitor and respond to issues with those connections. In the case where an astronaut is required to manually respond to a problem with a connection, the condition responsive device 100 may be able to direct the astronaut to the exact connection at issue. Without the condition responsive device 100, the astronaut may instead be required to troubleshoot each connection individually to test which one is experiencing the problem.

Referring back to the specific embodiment of the CATV communication system of FIG. 1, it should be understood that the condition responsive device 100 may be placed at any location relative to the distribution system 130 for which the condition responsive device 100 is monitoring. For example, the condition responsive device 100 may be located between the tap 90 and the subscriber's premise distribution system 130, in the case of a coaxial cable communication system provided by a supplier 20. This location may be conveniently located within the building 10, or exterior to the building 60. Similarly, the condition responsive device 100 may be located within individual apartments of an apartment building 70 or exterior to an apartment building 50. It should be understood that the condition responsive device 100 may be placed at any location, such as the coffee shop 80 or other premise, where communication system services, including CATV internet, voice over internet protocol ("VOIP"), or other unidirectional or bidirectional services are being proffered via the communications system. The condition responsive device 100 can be inserted into a signal transmission line of any coaxial cable communication system, or other communication system as described hereinabove. The condition responsive device 100 may also be inserted into a signal transmission line within the proximity of a premise of the subscriber 21, either inside a building structure or, alternately, somewhere outside the building structure. It should be understood that the condition responsive device 100 may be located farther from a communication system of a premise. For example, the condition responsive device 100 may be located directly at the head end or supplier 20. It should be understood, however, that in the case that the condition responsive device 100 is located nearby or inside a premise of the communication system, the ability of the condition responsive device 100 to monitor, fix, or alter the communication system may be enhanced. However, in one embodiment of the present invention, a global condition responsive device 100 is located at the head end in order to monitor the connections of each of the condition responsive devices 100 in a global manner and on a more macro-oriented scale.

Figure 2:
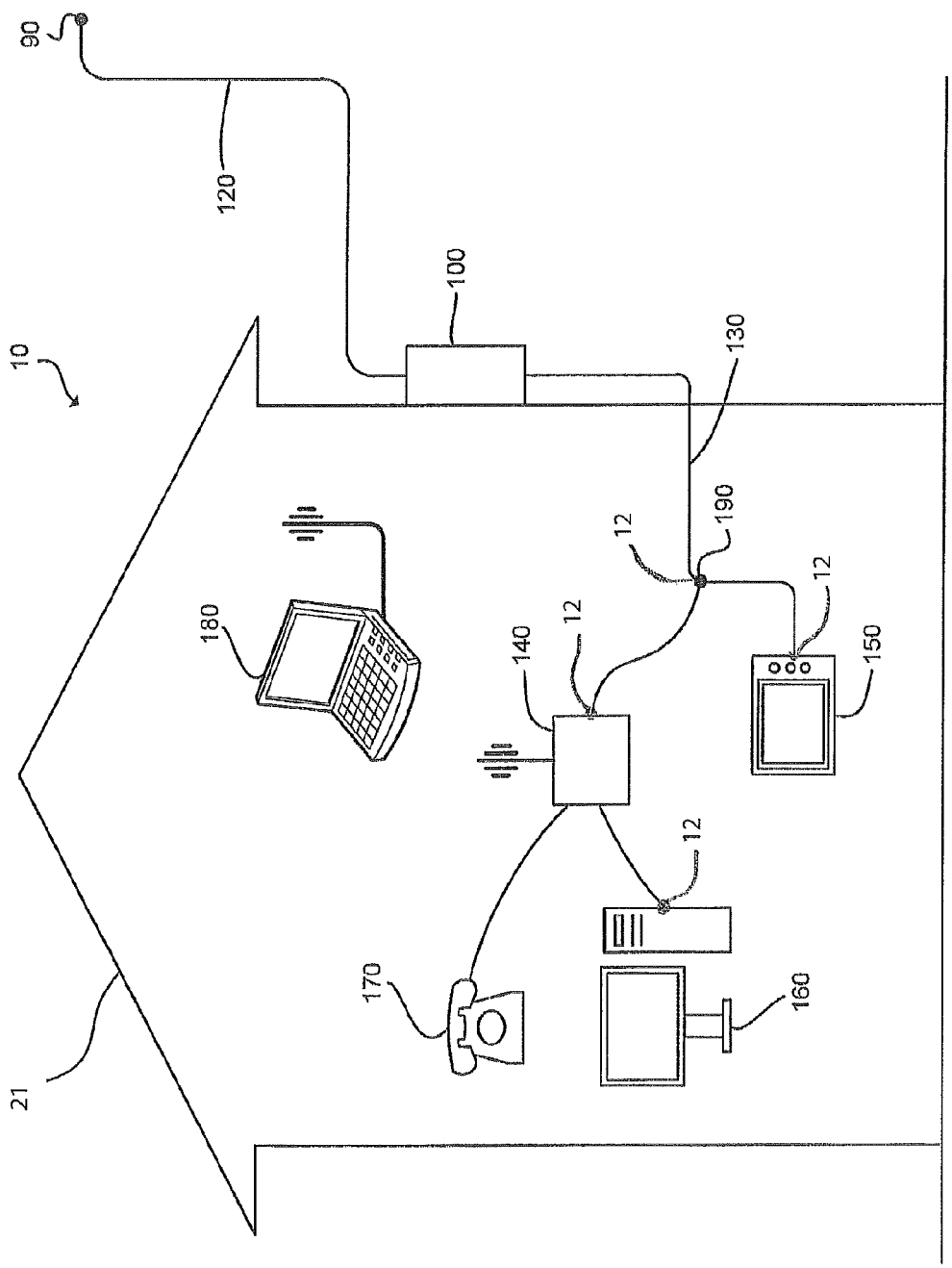
FIG. 2 depicts a subscriber's premise arranged in accordance with an embodiment of the present invention.

Referring now to FIG. 2, a premise having a coaxial cable communication system is shown arranged according to one embodiment of the present invention. The distribution system 130 of the premise may be split using a splitter 190 so that upstream and downstream signals may pass to and from a television 150 and a modem 140 in accordance with practices well known in the art. The modem 140 may include VOIP capabilities affording telephone 170 services and may include a router affording internet services to a desktop computer 160 and a laptop computer 180, for example.

Additionally, it is common practice in a coaxial cable communication system to provide a "set-top box" ("STB") or "set-top unit" ("STU") for use directly with the television 150. For the sake of clarity, however, there is no representation of an STB or STU included in FIG. 2. The STB and STU are mentioned here in light of the fact that many models utilize the upstream bandwidth to transmit information relating to "pay-per-view" purchase, billing, etc. Accordingly, it should be understood that even though FIG. 2 explicitly shows that there is only one condition responsive device 100 used for each device generating upstream data packets, each condition responsive device 100 may be used with two or more devices (e.g. a modem, a STB, a STU, a dedicated VOIP server, etc.) that transmit upstream data packets via the upstream bandwidth of the coaxial cable communications system.

Figure 8:
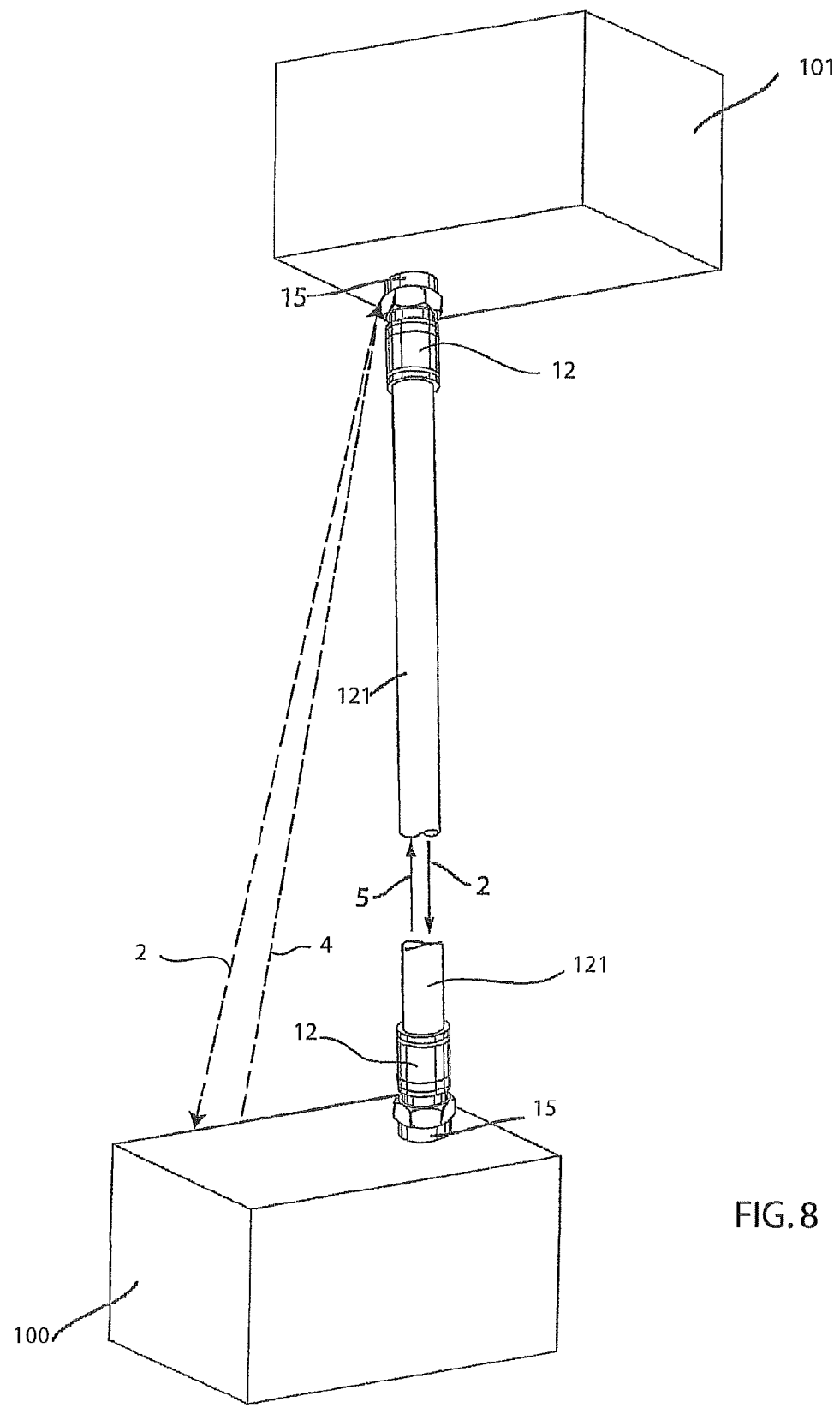
FIG. 8 depicts a coaxial cable connector attached to a device and connected with coaxial cable to a condition responsive premise device, in accordance with the present invention.

The drop transmission line 120 and the distribution system 130 may be electrically connected with a cable, such as a coaxial cable 121 (shown in FIG. 8). The cable may provide a path to send electrical signals to and from the devices 100, 140, 150, 160, 170, 180, 190 to and from the supplier 20. The cable may be connected to one, some, or all of the devices 100, 140, 150, 160, 170, 180, 190 in the premise distribution system 130 with a cable connector 12. Alternately, some of the devices 100, 140, 150, 160, 170, 180, 190 connected to the premise distribution system may be connected wirelessly, or through other variable communication means. As shown in FIG. 2, the laptop computer 180 may be connected wirelessly. Wireless devices, such as the laptop computer 180, may also include a connector, such as the connector 12. In the case of wireless devices, a wireless connector may be in communication with the condition responsive device 100 in order to wirelessly send physical parameter status signals to the condition responsive device 100, as will be described in further detail hereinbelow.

Figure 3:
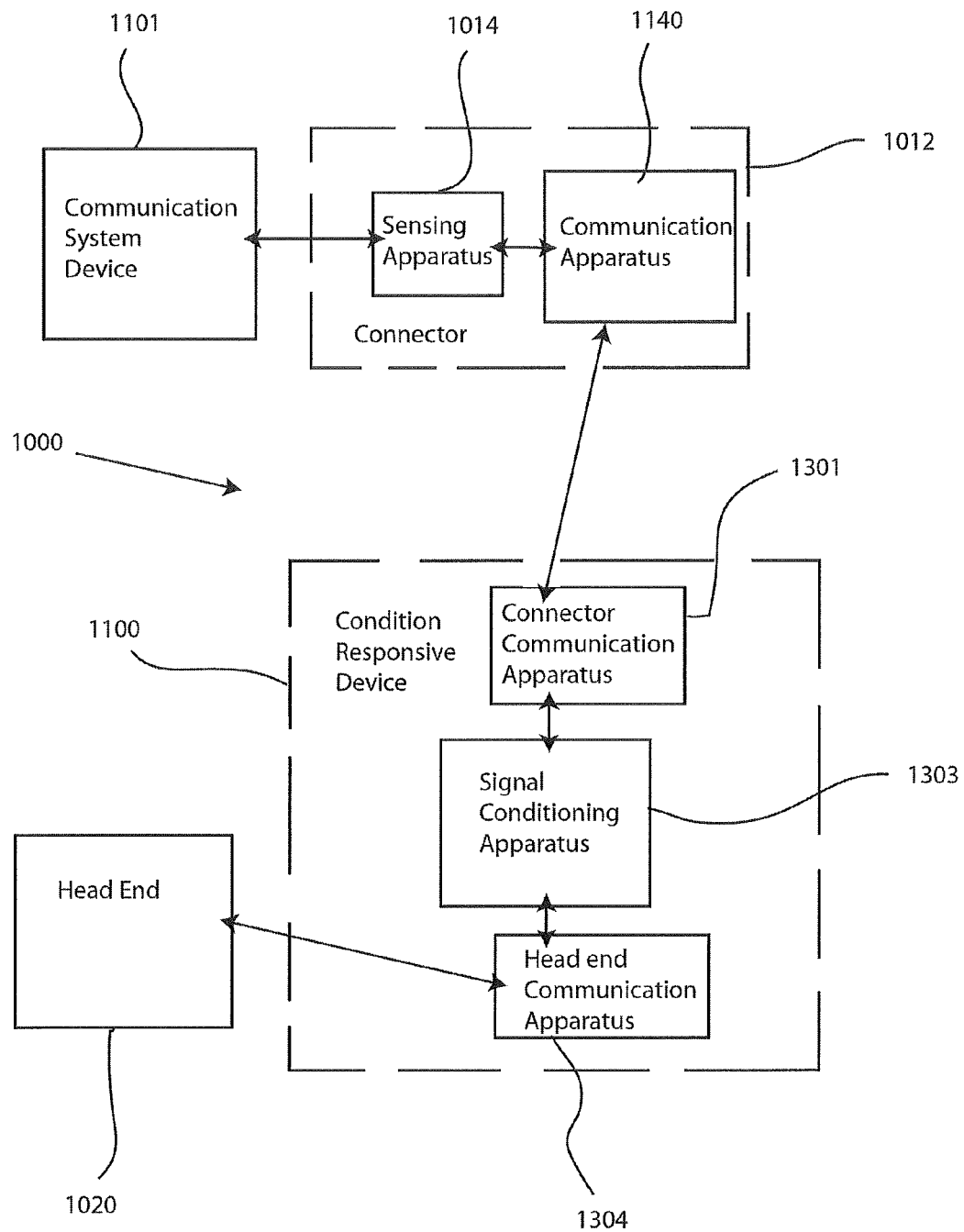
FIG. 3 depicts a block diagram of a communication system in accordance with one embodiment of the present invention.

FIG. 3 shows a block diagram of a communication system 1000 according to one embodiment of the present invention is shown. The communication system 1000 includes at least one communication system device 1101, such as one of the devices 100, 140, 150, 160, 170, 180, 190 described hereinabove. A connector 1012 is connected to the communication system device 1101. The connector 1012 may be a smart connector or node, such as the connector 12, and includes at least one sensing apparatus 1014 that may sense one or more physical parameters associated with the functional conditions of the connection of the connector 1012 with the device 1101. The connector 1012 also includes a communication apparatus 1140 that is able to send and receive signals to and from a condition responsive device 1100. The transmitted signals sent may pertain to one of the conditions sensed by the sensing apparatus 1014. The condition responsive device 1100 may be substantially similar to the condition responsive device 100 shown in FIGS. 1, 2, 8 and 9 and includes a connector communication apparatus 1301 that is configured to send and receive signals to and from the connector 1012. The condition responsive device 1100 further includes a signal conditioning apparatus 1303 that is configured to analyze the signals received from the connector 1012 at the connector communication apparatus 1301, and condition the signal appropriately. The signal conditioning apparatus may condition the signal in any appropriate way, or may alternately or additionally initiate a response signal to be sent from the condition responsive device 1100 to another device on the system, such as the connector 1012, the communication system device 1101, or a head end 1020. Furthermore, the signal conditioning apparatus may include a head end communication apparatus 1304 for sending signals to and from the head end 1020. The head end 1020 may be a work station at a communication system supplier. It should be understood that the head end 1020 may be any device operated or controlled by a supplier or technician of the communication system 1000. It should also be understood that the signal conditioning apparatus 1100 may include a plurality of connector communication apparatuses 1301 such that several connectors 1012 may be connected to the condition responsive device 1100. Alternately, the connector communication apparatus 1301 of the condition responsive device 1100 may be configured to receive and transmit signals to a plurality of connectors 1012 of the communication system 1000. For the sake of simplicity, however, only one communication system device 1101 and corresponding connector 1012 is shown being operably connected to the condition responsive device 1100.

Figure 4:
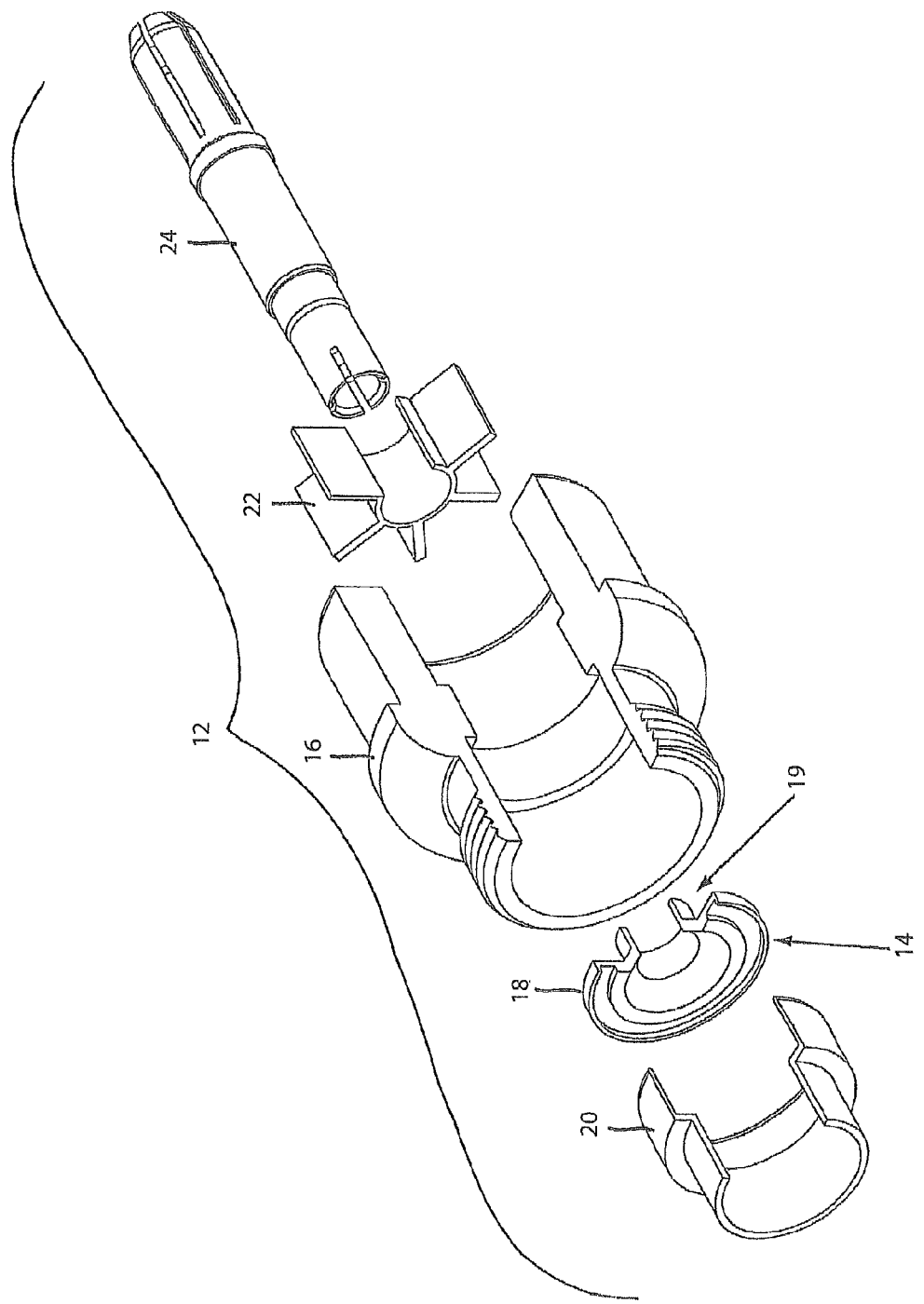
FIG. 4 depicts an exploded cut-away perspective view of an embodiment of a coaxial cable connector with a sensing circuit, in accordance with the present invention.

FIG. 4 shows an exploded cutaway view of one of the connectors 12, according to an embodiment of the present invention where the connectors 12 are coaxial cable connectors of a coaxial cable communications system. It should be understood that the connectors may also be RJ-45 connectors, optical fiber connectors, or other similar connectors. Embodiments of the connector 12 of the present invention may be considered "smart," in that the connector 12 is configured to sense and transmit a physical parameter status signal pertaining to the connection of the connector 12 to a port, such as an RF port 15 (shown in FIG. 8). A physical parameter status may be an ascertainable physical state relative to the connection of the coaxial cable connector. Furthermore, the physical parameter status may be used to help identify whether a connection of the connector 12 to the port 15 performs accurately. The connector 12 may be used to sense connection conditions, store data, and/or determine monitorable variables of physical parameter status such as presence of moisture (humidity detection, as by mechanical, electrical, or chemical means), connection tightness (applied mating force existent between mated components), temperature, pressure, amperage, voltage, signal level, signal frequency, impedance, return path activity, connection location (as to where along a particular signal path the connector 12 is connected), service type, installation date, previous service call dates, serial numbers, etc.

Figure 5:
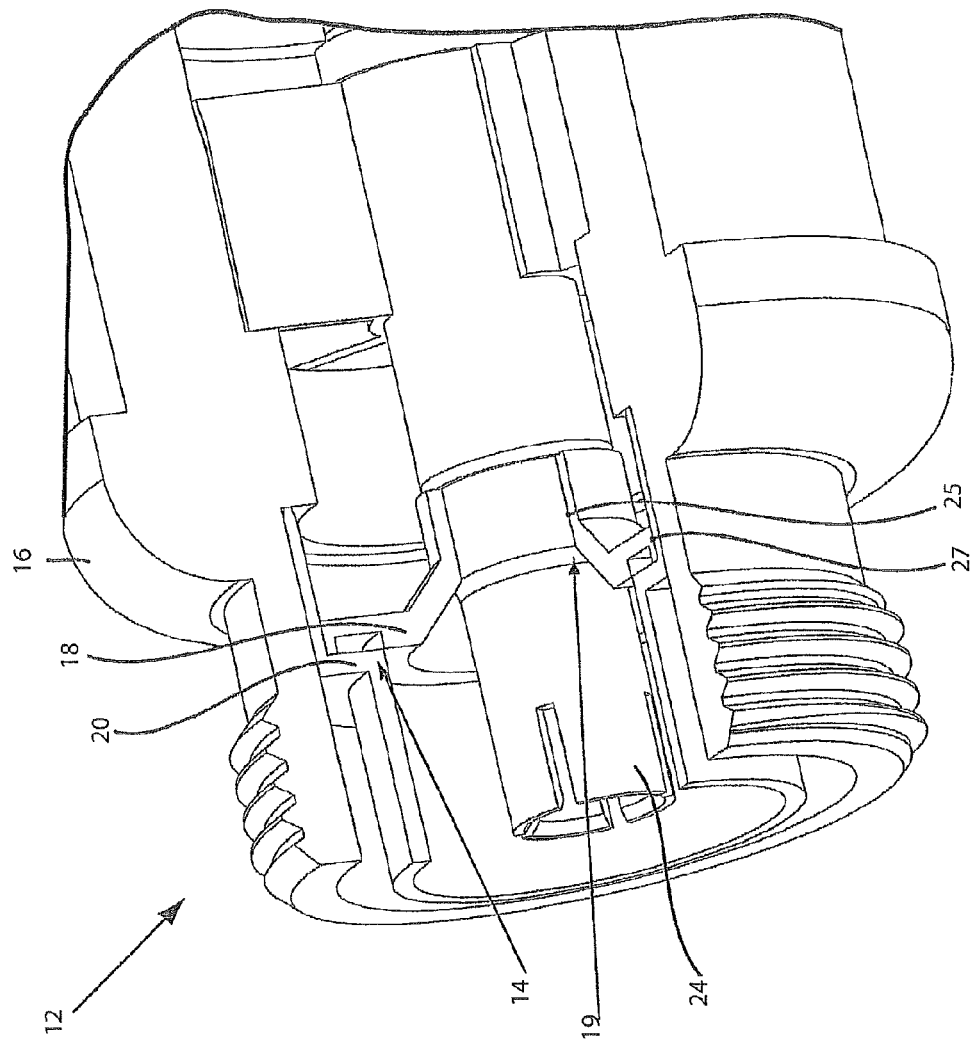
FIG. 5 depicts a close-up cutaway partial perspective view of an embodiment of a coaxial cable connector with a sensing circuit, in accordance with the present invention.
Figure 6:
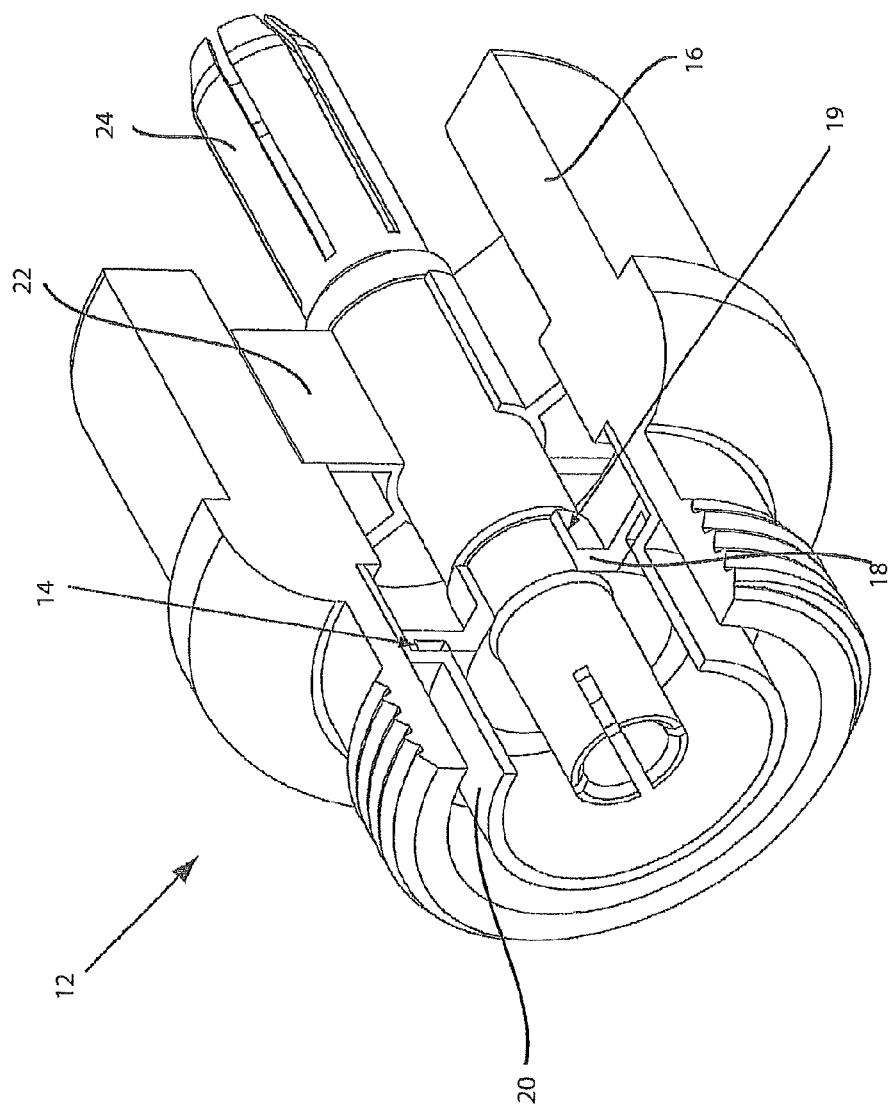
FIG. 6 depicts a cut-away perspective view of an embodiment of an assembled coaxial cable connector with an integrated sensing circuit in accordance with the present invention.
Figure 7:
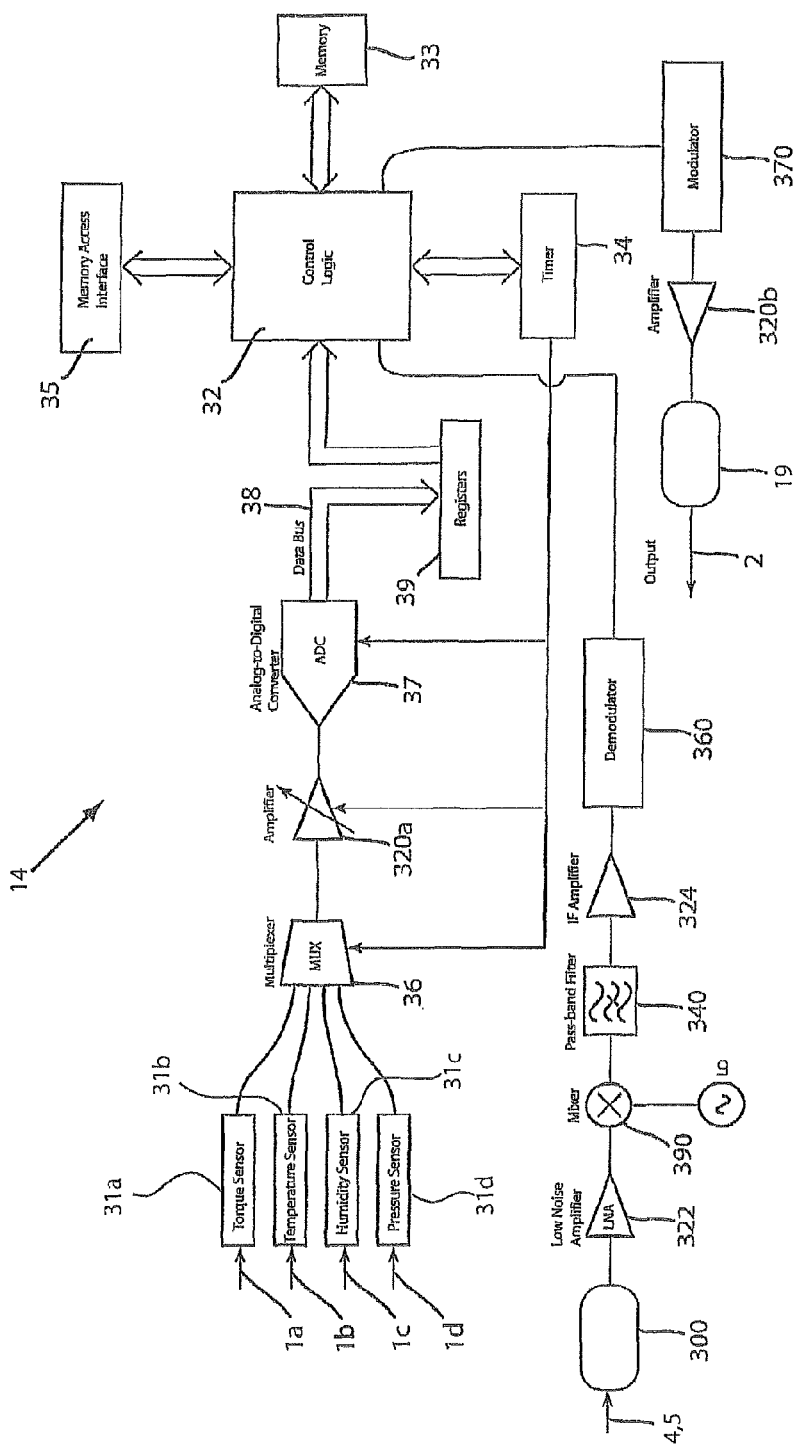
FIG. 7 depicts a schematic view of an embodiment of a sensing circuit, in accordance with the present invention.

Referring now to FIGS. 4-6, cut-away perspective views of an embodiment of the coaxial cable connector 12 with an internal sensing circuit 14, are shown in accordance with the present invention. The connector 12 may include a connector body 16. The connector body 16 may comprise a physical structure that houses at least a portion of any internal components of a coaxial cable connector 12. Accordingly, the connector body 16 may accommodate internal positioning of various components, such as a first spacer 18, an interface sleeve 21, a second spacer 22, and/or a center conductor contact 24 that may be assembled within the connector 12. In addition, the connector body 16 may be conductive. The structure of the various component elements included in a connector 12 and the overall structure of the connector 12 may operably vary. However, a governing principle behind the elemental design of all features of a coaxial connector 12 is that the connector 12 should be compatible with common coaxial cable interfaces pertaining to typical coaxial cable communications devices. Accordingly, the structure related to the embodiments of coaxial cable connectors 12, depicted in the various FIGS. 4-8, is intended to be exemplary. Those in the art should appreciate that a connector 12 may include any operable structural design allowing the connector 12 to sense a condition of a connection of the connector 12 with an interface to an RF port of a common coaxial cable communications device, and also report a corresponding connection performance status to a location outside of the connector 12.

The connector 12 may include a physical parameter status sensing circuit 14 that may enable the connector 12 to sense the physical parameters of the connection. A sensing circuit 14 may be integrated onto typical coaxial cable connector components. The sensing circuit 14 may be located on existing connector structures. For example, a connector 12 may include a component such as the first spacer 18 that the sensing circuit 14 may be positioned on. The physical parameter status sensing circuit 14 is configured to sense a condition of the connector 12 when the connector 12 is connected with an interface of a common coaxial cable communications device, such as an interface port 15 of any of a device 101 (shown in FIG. 8). It should be understood that the device 101 may be the premise device 100, the wireless transmitter 140, the television 150, the desktop computer 160, the telephone 170, the wireless computer 180, the modem 190, or any other device that is connectable to the coaxial cable communications system. Moreover, various portions of the circuitry of a sensing circuit 14 may be fixed onto multiple component elements of a connector 12.

Power for the physical parameter status sensing circuit 14 and/or other powered components of a connector 12 may be provided through electrical communication with the center conductor 24. For instance, traces may be printed on the first spacer 18 and positioned so that the traces make electrical contact with the center conductor contact 24 at a location 25 (see FIG. 5). Contact with the center conductor contact 24 at location 25 facilitates the ability for the sensing circuit 14 to draw power from the cable signal(s) passing through the center conductor contact 24. Traces may also be formed and positioned so as to make contact with grounding components. For example, a ground path may extend through a location 27 between the first spacer 18 and the interface sleeve 21, or any other operably conductive component of the connector 12. A connector 12 may be powered by other means. For example, the connector 12 may include a battery, a micro fuel cell, a solar cell or other like photovoltaic cell, a radio frequency transducer for power conversion from electromagnet transmissions by external devices, and/or any other like powering means. Power may come from a DC source, an AC source, or an RF source. In some embodiments, power for the connector 12 may be derived directly from the condition responsive device 100. Those in the art should appreciate that a physical parameter status sensing circuit 14 should be powered in a way that does not significantly disrupt or interfere with electromagnetic communications that may be exchanged through the connector 12.

With continued reference to the drawings, FIG. 6 depicts a schematic view of an embodiment of a physical parameter status sensing circuit 14. It should be understood that the schematic view depicted in FIG. 7 may be applied not only to coaxial cable connectors as described herein, but may also be applied to fiber optic cable connectors, RJ-45 cable connectors, wireless cable connectors and the like. Embodiments of a physical parameter status sensing circuit 14 may be variably configured to include various electrical components and related circuitry so that a connector 12 can measure or determine connection performance by sensing a condition 1 relative to the connection of the connector 12, wherein knowledge of the sensed condition 1 may be provided as physical parameter status information and used to help identify whether the connection performs accurately. Accordingly, the circuit configuration as schematically depicted in FIG. 6 is provided to exemplify one embodiment of a sensing circuit 14 that may operate with a connector 12. Those in the art should recognize that other circuit 14 configurations may be provided to accomplish the sensing of physical parameters corresponding to a connector 12 connection. For instance, each block or portion of the sensing circuit 14 can be individually implemented as an analog or digital circuit.

As schematically depicted, a sensing circuit 14 may comprise one or more sensors 31. For example, the sensing circuit 14 may include a torque sensor 31a configured to detect the tightness of the connection of the connector 12 with an interface of another coaxial communications device having an RF port. The torque sensor 31a may measure, determine, detect, or otherwise sense a connection condition 1a, such as the mating force resultant from the physical connection of the connector 12 with the interface, such as an RF port 15 of the device 101. A connector 12 may include a plurality of sensors 31. For instance, in addition to a torque sensor 31a, a connector 12 may include: a temperature sensor 31b configured to sense a connection condition 1b, such as the temperature of all or a portion of the connector 12; a humidity sensor 31c configured to sense a connection condition 1c, such as the presence and amount of any moisture or water vapor existent in the connector 12 and/or in the connection between the connector 12 and an interface with another cable communications device; and a pressure sensor 31d configured to sense a connection 1d, such as the pressure existent in all or a portion of the connector 12 and/or in the overall connection involving the connector 12 and an interface with another cable communications device. Other sensors may also be included in a sensing circuit 14 to help detect connection conditions 1 related to physical parameters such as amperage, voltage, signal level, signal frequency, impedance, return path activity, connection location (as to where along a particular signal path a connector 12 is connected), service type, installation date, previous service call date, serial number, etc.

A sensed connection condition 1 may be electrically communicated within a sensing circuit 14 from a sensor 31. For example the sensed condition may be communicated as physical parameter status information to a control logic unit 32. The control logic unit 32 may include and/or operate with protocol to govern what, if any, actions can/should be taken with regard to the sensed condition 1 following its electrical communication to the control logic unit 32. The control logic unit 32 may be a microprocessor or any other electrical component or electrical circuitry capable of processing a signal based on governing logic. A memory unit 33 may be in electrical communication with the control logic unit 32. The memory unit 33 may store physical parameter status information related to sensed connection conditions 1. The stored physical parameter status information may then be later communicated or processed by the control logic unit 32 or otherwise operated on by the sensing circuit 14. Furthermore the memory unit 33 may be a component or device that may store governing protocol. The governing protocol may be instructions that form a computer program, or may be simple logic commands. Stored protocol information that governs control logic operations may comprise a form of stored program architecture versatile for processing over some interval of time. The governing protocol may provide the connector 12 with a means for differentiating the particular problems associated with the connection, and sensed in by the sensor 31. For example, the connector 12 may be able to associate a particular error code with a particular condition that sensed by the sensor 31, and associate another error code with another condition. This error code may then be communicated to the condition responsive device 100, so that the condition responsive device 100 may also differentiate the particular problem associated with the connection. A sensing circuit 14 may further include a timer 34, wherein the timer 34 may be used to tag a particular sensed condition with the time that the condition is sensed. In addition, a sensing circuit 14 may include a memory access interface 35 to house the commands. The memory interface 35 may also be used to store relevant information about the conditions sensed by the sensor 31. The memory access interface 35 may be in electrical communication with the control logic unit 32.

Various other electrical components may be included in embodiments of a sensing circuit 14. For example, where the circuit 14 includes multiple sensors 31, a multiplexer 36 may be included to integrate signals from the various sensors 31. Moreover, depending on signal strength coming from a sensor 31, a sensing circuit 14 may include an amplifier 320a to adjust the strength of the signal from the sensor 31 sufficient to be operated on by other electrical components, such as the control logic unit 32. Additionally, an ADC unit 37 (analog-to-digital converter) may be included in a sensing circuit 30. The ADC unit 37 may, if needed, convert analog signals originating from the sensors 31 to digital signals. The multiplexer 36, ADC unit 37 and amplifier 320a, may all be in parallel with the control logic unit 32 and the timer 34 helping to coordinate operation of the various components. A data bus 38 may facilitate transfer of signal information between a sensor 31 and the control logic unit 32. The data bus 38 may also be in communication with one or more registers 39. The registers 39 may be integral to the control logic unit 32, such as microcircuitry on a microprocessor. The registers 39 generally contain and/or operate on signal information that the control logic unit 32 may use to carry out sensing circuit 30 functions, possibly according to some governing protocol. For example, the registers 39 may be switching transistors integrated on a microprocessor, and functioning as electronic "flip-flops".

In addition, the sensing circuit 14 may include and/or operate with the input component 300, wherein the input component 300 is in electrical contact with the center conductor 24 of a connected coaxial cable 121. For instance, the input component 300 may be a conductive element, such as a lead, trace, wire or other electrical conduit, that electrically connects the sensing circuit 14 to the center conductor contact 24 at or near a location 25 (see FIG. 5). Accordingly, a signal 5 may originate from some place outside of the connector 12, such as a point along the cable line or at the condition responsive device 100, and be passed through the cable 121 until the signal 5 is inputted through the input component 300 into the connector 12 and electrically communicated to the sensing circuit 14. Thus a sensing circuit 14 of a connector 12 may receive input signals from a point somewhere along the cable line, in particular the condition responsive device 100. Still further, an input component 300 may include wireless capability. For example the input component 300 may comprise a wireless receiver capable of receiving electromagnet transmissions, such as, radio-waves, Wi-fi transmissions, RFID transmissions, Bluetooth™ wireless transmissions, and the like. Accordingly, an incoming signal, such as wireless signal 4 depicted in FIG. 7, may originate from some place outside of the connector 12, such as the condition responsive device 100 as shown, and be received by the input component 300 in the connector 12 and then electrically communicated to the sensing circuit 14.

A sensing circuit 14 may include various electrical components operable to facilitate communication of a signal 4, 5 received by the input component 300. It should be understood that the input component may receive both the wireless signal 4, and the signal 5 that is receivable through the coaxial cable 121. The sensing circuit 14 may include a low noise amplifier 322 in electrical communication with a mixer 390. In addition, the sensing circuit 14 may include a pass-band filter 340 configured to filter various signal band-widths related to incoming signals 4, 5. Furthermore, the sensing circuit 14 may include an IF amplifier 324 configured to amplify intermediate frequencies pertaining to received the incoming signals 4, 5 communicated through the input component 300 to the sensing circuit 14. If needed, a sensing circuit 14 may also include a demodulator 360 in electrical communication with the control logic unit 32. The demodulator 360 may be configured to recover the information content from the carrier wave of a received the incoming signals 4, 5.

Monitoring a physical parameter status of a connection of the connector 12 may be facilitated by the internal sensing circuit 14 configured to report a determined condition of the connector 12 connection. The sensing circuit 14 may include a signal modulator 370 in electrical communication with the control logic unit 32. The modulator 370 may be configured to vary the periodic waveform of an output signal 2, provided by the sensing circuit 14. The strength of the output signal 2 may be modified by an amplifier 320*b*. Ultimately the output signal 2 from the sensing circuit 14 is transmitted to an output component 19 in electrical communication with the sensing circuit 14. Those in the art should appreciate that the output component 19 may be a part of the sensing circuit 30. For example the output component 19 may be a final lead, trace, wire, or other electrical conduit leading from the sensing circuit 14 to a signal exit location of a connector 12.

Embodiments of a connector 12 include a physical parameter status output component 19 in electrical communication with the sensing circuit 14. The status output component 19 is positioned within the connector body 16 and configured to facilitate reporting of information relative to one or more sensed conditions comprising a physical parameter status to a location outside of the connector body 16. An output component 19 may facilitate the dispatch of information pertaining to a physical parameter status associated with condition(s) 1 sensed by a sensor 31 of a sensing circuit 14 and reportable as information relative to the performance of the connection of a connector 12. For example, the sensing circuit 14 may be in electrical communication with the center conductor contact 24 through a status output component 19, such as a lead or trace, in electrical communication with the sensor circuit 14 and positioned to electrically connect with the center conductor contact 24 at a location 25 (see FIG. 4). Sensed physical parameter status information may accordingly be passed as a signal 2 from the sensing circuit 14 of the first spacer 18 through the output component 19, such as traces electrically linked to the center conductor contact 24. The signal(s) 2 can then travel outside of the connector 12 along the cable line 121 (see FIG. 8) corresponding to the cable connection applicable to the connector 12. Hence, the reported physical parameter status may be transmitted via signal(s) 2 through the output component 19 and may be accessed at a location along the cable line outside of the connector 12 by the condition responsive device 100.

Referring further to FIGS. 4-7 and with additional reference to FIG. 8 embodiments of a coaxial cable communication system may include the condition responsive device 100 located externally to the connector 12. The condition responsive device 100 may configured to receive, via the status output component 19, information from the sensing circuit 14. The condition responsive device 100 may be located anywhere along the cable line to which the connector 12 is attached. In the case that the connector 12 is a wireless connector, the condition responsive device 100 may also be located in any appropriate location to receive wireless sensing signals from the connector 12. For example, a physical parameter status may be reported through an output component 19 in electrical communication with the center conductor 24 of the cable 121. Then the reported status may be monitored by the condition responsive device 100 to evaluate the reported physical parameter status and help maintain connection performance. The connector 12 may ascertain connection conditions and may transmit physical parameter status information automatically at regulated time intervals, or may transmit information when polled from the condition responsive device 100.

Operation of a connector 12 may be altered through transmitted signals 4, 5 from the condition responsive device 100 or by signals transmitted onsite near the connector 12 connection. For example, the command of the wireless signal 4 may be a directive that triggers governing protocol of the control logic unit 32 to execute particular logic operations that control connector 12 functionality, for example, to close an electrical path. Alternately, the condition responsive device 100 may transmit a signal 5 through the cable 121 that includes a command operable to initiate or modify functionality of the connector 12. The command from the condition responsive device 100, in the form of the signal 5, may be a directive that triggers governing protocol of the control logic unit 32 to execute particular logic operations that control connector 12 functionality. The functionality of the condition responsive device 100 will be described in greater detail below. The condition responsive device 100, for instance, may command the connector 12, through the input component 300, to presently sense a connection condition 1*c* related to current moisture presence, if any, of the connection. Thus the control logic unit 32 may communicate with the humidity sensor 31*c*, which in turn may sense a moisture condition 1*c* of the connection. The sensing circuit 14 could then report a real-time physical parameter status related to moisture presence of the connection by dispatching a signal 2 through an output component 19 and back to the condition responsive device 100 located outside of the connector 12. The condition responsive device 100, following receipt of the moisture monitoring report, could then transmit another signal 5 communicating a command for the connector 12 to sense and report physical parameter status related to moisture content twice a day at regular intervals for the next six months. It should be understand that the present invention contemplates any monitoring arrangements that may be made between the condition responsive premise device 100 and the connector 12.

The sensing circuit 14 may also be calibrated. Calibration may be efficiently performed for a multitude of sensing circuits similarly positioned in connectors 12 having substantially the same configuration. For example, because a sensing circuit 14 may be integrated onto a typical component of a connector 12, the size and material make-up of the various components of the plurality of connectors 12 can be substantially similar. As a result, a multitude of connectors 12 may be batch-fabricated and assembled to each have substantially similar structure and physical geometry. Accordingly, calibration of a sensing circuit 14 may be approximately similar for all similar connectors fabricated in a batch. Furthermore, the sensing circuit 14 of each of a plurality of connectors 12 may be substantially similar in electrical layout and function. Therefore, the electrical functionality of each similar sensing circuit 14 may predictably behave in accordance to similar connector 12 configurations having substantially the same design, component make-up, and assembled geometry. Accordingly, the sensing circuit 14 of each connector 12 that is similarly mass-fabricated, having substantially the same design, component make-up, and assembled configuration, may not need to be individually calibrated. Calibration may be done for an entire similar product line of connectors 12. Periodic testing can then assure that the calibration is still accurate for the line. Moreover, because the sensing circuit 14 may be integrated into existing connector components, the connector 12 can be assembled in substantially the same way as typical connectors and requires very little, if any, mass assembly modifications.

Various connection conditions 1 pertinent to the connection of a connector 12 may be determinable by a sensing circuit 14 because of the position of various sensors 31 within the connector 12. Sensor 31 location may correlate with the functionality of the various portions or components of the connector 12. For example, a sensor 31a configured to detect a connection tightness condition 1a may be positioned near a connector 12 component that contacts a portion of a mated connection device, such as an RF interface port 15 of a device 100, 140, 150, 160, 170, 180, 190. A humidity sensor 31c configured to detect a moisture presence condition 1c may be positioned in a portion of the connector 12 that is proximate the attached coaxial cable 121 that may have moisture included therein, which may enter the connection.

The various components of a connector 12 assembly create a sandwich of parts, similar to a sandwich of parts existent in typical coaxial cable connectors. Thus, assembly of a connector 12 having an integral sensing circuit 14 may be no different from or substantially similar to the assembly of a common coaxial cable connector that has no sensing circuit 14 built in. The substantial similarity between individual connector 12 assemblies can be very predictable due to mass fabrication of various connector 12 components. As such, the sensing circuits 14 of each similarly configured connector 12 may not need not be adjusted or calibrated individually, since each connector 12, when assembled, should have substantially similar dimension and configuration. Calibration of one or a few connectors 12 of a mass-fabricated batch may be sufficient to render adequate assurance of similar functionality of the other untested/uncalibrated connectors 12 similarly configured and mass produced.

It is important that a coaxial cable connector be properly connected or mated to an interface port of a device for cable communications to be exchanged accurately. One way to help verify whether a proper connection of a coaxial cable connector is made is to determine and report mating force in the connection. Common coaxial cable connectors have been provided, whereby mating force can be determined. However, such common connectors are plagued by inefficient, costly, and impractical considerations related to design, manufacture, and use in determining mating force. Accordingly, there is a need for an improved connector for determining mating force. Various embodiments of the present invention can address the need to efficiently ascertain mating force and maintain proper physical parameter status relative to a connector connection. Additionally, it is important to determine the humidity status of the cable connector and report the presence of moisture.

While the connector 12 has been described herein above and depicted in FIGS. 4-6 and 8 as a coaxial cable connector, it should be understood that other types of communication system connectors are contemplated. For example, the same principles as described hereinabove may be applied to RJ-45 connectors, optical fiber connectors, closed circuit security system connectors, wireless connectors and the like. In any case, in each embodiment of the connector 12, it is configured to obtain physical parameter status signals from a sensing mechanism and transmit those signals to the condition responsive device 100.

Referring back to FIG. 2, a connector 12, 112, 212, described in detail hereinabove, may be connected to any of the devices, such as the device 100, 140, 150, 160, 170, 180, 190 in the distribution system 130. The connector 12, 112, 212 may have any of the sensors 31, 131, 231 coupled to a sensing circuit 14, and may be configured to transmit signals containing information regarding the various physical parameters and conditions as described hereinabove. The connectors 12, 112, 212 are configured to send this information, via the coaxial cable 121, or wirelessly, to the condition responsive device 100. The connectors 12, 112, 212 may send an error code to the condition responsive device 100 in the case that one of the various physical parameters and conditions is not consistent with a predetermined appropriate value or set physical reading. For example, if the connection tightness was below a certain pressure, torque, or other like mating force, the connector 12, 112, 212 may send a particular error code or other response signal to the condition responsive device 100 pertaining to this error, thereby alerting the condition responsive premise device that the connection of the connector 12, 112, 212 may be loose. Alternately, the connector 12, 112, 212 may send an electrical signal containing a value that is precise to the particular amount of pressure, torque, or other like mating force at the connection. In this case, the condition responsive device 100 may determine whether the value is appropriate, or whether the connection is not tight enough. In any event, the condition responsive device 100 is receptive of signals from the connector 12, 112, 212. The condition responsive device 100 is described in further detail herein below.

Figure 9:
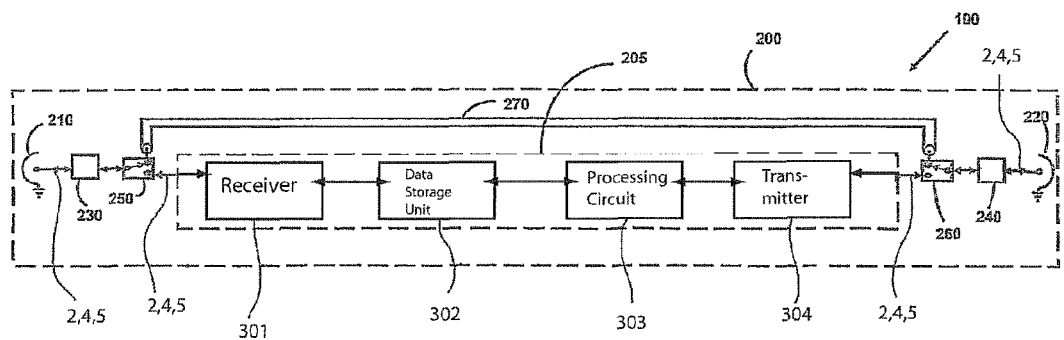
FIG. 9 depicts a partial circuit diagram of a condition responsive premise device made in accordance with an embodiment of the present invention.

Referring now to FIG. 9, a partial circuit diagram of the condition responsive device 100 is shown in accordance with one embodiment of the present invention. The condition responsive device 100 may include a plurality of circuits 200, 205. It should be understood that the circuits 200, 205 may comprise a variety of different elements including capacitors, inducers, resistors, transmitters, switches, signal paths, frequency band splitters, microprocessors, receivers, band pass filters, comparators, voltage sources, voltage dividers, phase locked loop control systems, variable amplifiers, amplifiers, variable attenuators, attenuators, signal level detectors, taps, filters, tuners, output level compensation devices, variable slope adjusting circuits, couplers, resistive dividers, synch detectors, low pass filters and the like. The combination of these and other appropriate circuitry elements will be apparent to those skilled in the art. Furthermore, the circuits 200, 205 may each include a plurality of circuits all interconnected such that the combination performs the desired functions of the condition responsive device 100, described herein below. The condition responsive premise device is not limited to the circuits 200, 205, but these circuits will be described as an exemplary embodiment of the condition responsive premise device 100.

The condition responsive device 100 may include a circuit that makes the condition responsive device 100 a dynamically configurable frequency band selection device between a distribution system, such as the supplier 20 and the subscriber 21. Alternately, the condition responsive device 100 may include a circuit that makes the condition responsive device 100 an upstream bandwidth conditioning device between a distribution system, such as the supplier 20 and the subscriber 21. Still further, the condition responsive device 100 may include a circuit that makes the condition responsive premise device a downstream output level and tilt compensation device between a distribution system, such as the supplier 20 and the subscriber 21. Moreover, the condition responsive device 100 may include circuitry permitting tri-functionality as a dynamically configurable band selection device, an upstream bandwidth conditioning device and a downstream output level and tilt compensation device. These circuits allow the condition responsive device 100 to actively condition the signals that are received by the supplier 20 and the subscriber 21. This conditioning may include amplification, attenuation, equalization and/or noise reduction. Additionally, the condition responsive device 100 may shut down unused return path legs or lines, thereby reducing noise that may go upstream to the head end or the supplier 20.

As shown in FIG. 9, a main circuit 200 of the condition responsive premise device 100 includes a supplier side 210 and a premise side 220. The supplier side 210 is positioned to receive the downstream bandwidth from the supplier 20 (FIG. 1) and to send the upstream bandwidth to the supplier 20. The premise side 220 is positioned to send the downstream bandwidth to the subscriber 21 and to receive the upstream bandwidth from the subscriber 21. The premise side 220 may also be configured to receive the signals regarding the physical parameter status and conditions from the connectors 12, 112, 212. Each of the supplier side 210 and the premise side 220 can include a traditional threaded 75 ohm coaxial cable connector so that the condition responsive device 100 can be easily placed in series with the drop transmission line 120 and the premise distribution system 130. Alternatively, each of the supplier side 210 and the premise side 220 may include a proprietary coaxial cable connecter structured to hinder attempts at tampering with or theft of the condition responsive device 100. Other coaxial cable connectors may also be used depending on the type and/or size of the drop transmission line 120, the premise distribution system 130, or system impedance other than 75 ohms.

The condition responsive device 100 preferably may include a lightening protection device 230 positioned near the supplier side 210 and a lightening protection device 240 positioned near the premise side 220. Having two lightening protection devices 230, 240 attempts to protect the condition responsive device 100 from energy passing from the drop transmission line 120 from a lighting strike and from energy passing from the premise distribution system 130 from a lighting strike. It should be understood that the lightening protection devices may not be necessary if/when the condition responsive device 100 is configured to be placed in a coaxial cable communication system that utilizes non-conductive signal transmission lines or when the coaxial cable communication system is physically and electrically shielded from potential contact with lighting. Any of the high quality, commercially available lightning protection devices will function well within the specified locations within the condition responsive device 100.

The condition responsive device 100 may include two power bypass failure switches 250, 260 that may route all of the upstream\downstream signals through a bypass signal path 270 (e.g. a coaxial cable, an optical cable, a microstrip, a stripline, etc.) in the event of a power outage. The bypass failure switches 250, 260 may be located near the supplier end 210 and premise end 220, respectively. In an effort to protect the bypass failure switches 250, 260 from damage due to lightening energy, the bypass failure switches 250, 260 may be placed between the lightening protection devices 230, 240 and the supplier end 210 and premise end 220.

Each of the bypass failure switches 250, 260 may include a default position bypassing the upstream/downstream signals through the bypass signal path 270 at any time power is removed from the condition responsive device 100. When power is applied, each of the bypass failure switches 250, 260 can actuate to a second position that disconnects the bypass signal path 270 and passes all of the upstream\downstream signal transmissions along another path through a circuit 205 within the main circuit 200. The switches may also be controlled such that when there is a fault detected in the condition responsive device 100 that could abnormally hinder the flow of the upstream\downstream bandwidths through the circuit 205, the switches 250, 260 are moved to their default position sending the upstream/downstream signal transmissions through the bypass signal path 270. Any of the high quality, commercially available signal transmission switches will function well within the specified locations within the condition responsive device 100. The bypass signal path 270 can be any suitable coaxial cable or optical cable depending on the coaxial cable communication system configuration.

The condition responsive device 100 may include a circuit 205. The circuit 205 may be located substantially within the main circuit 200. It should be understood that the circuit 205 herein may refer to a series of circuits performing the relevant functions of the condition responsive device 100, and may include a plurality of electrical elements, recited herein above. The circuit 205 may include a means for receiving a physical parameter status signal from a coaxial connector 12, 112, 212 connected to a monitored port 15 of the coaxial cable communication system, the physical parameter status signal containing data pertaining to a condition of the connection. The means for receiving a physical parameter status signal may include a receiver 301 configured to receive a physical parameter status signal from a connector 12, 112, 212 that is connected to a port 15 to be monitored in the coaxial cable communication system such as the subscriber's premise distribution system 130. The physical parameter status may contain data pertaining to a condition of the connection, as described hereinabove.

The condition responsive device 100 may further include a means for storing data sent by the connector 12, 112, 212. The means for storing data may include a storage unit 302 configured to store the data sent by the connector 12, 112, 212. For example, the data may pertain to a condition such as connection tightness, pressure, moisture, temperature, amperage, voltage, signal level, signal frequency, impedance, return path activity, connection location, service type, installation date, previous service call dates, and serial number. The storage unit 302 may be a computer hard drive, or any other device having memory and capable of storing data.

Furthermore, the condition responsive device 100 may contain a means for analyzing the physical parameter status data of a connector 12, 112, 212 to determine whether a communications signal adjustment, such as a bandwidth adjustment, is appropriate. The analyzing means may be provided by a processing circuit 303 or microprocessor that is configured to analyze the data to determine whether a communications signal adjustment, such as a bandwidth adjustment, is appropriate. It should be understood that the processing circuit 303 may be a microprocessor, system processor, chip, logic circuit, or other such device. The processing circuit 303 may be configured to initiate adjustment or alteration of a coaxial cable communications signal of bandwidth in the coaxial cable communication system if the processing circuit 303 determines that adjustment is appropriate. For example, the communications signal level adjustment may include modifying the bandwidth, increasing the signal attenuation, shutting down an unused return path leg, amplification, filtration and/or equalization. For example, if the data received by the condition responsive device 100 from the connector 12, 112, 212 via the signals 2, 2b, alerts the processing circuit 303 of a condition that a loose connection is causing unwanted noise upstream, the processing circuit 303 may initiate a response to shut down this path, and\or to attenuate the signal to reduce the noise.

The condition responsive device 100 may further include a means for determining whether a response signal is appropriate. The means for determining whether a response signal is appropriate may also be provided by the processing circuit 303. The processing circuit 303 may further be configured to analyze the data to determine if there is a problem in the connection of the coaxial connector 12, 112, 212 as associated with the monitored port 15.

Figure 10:
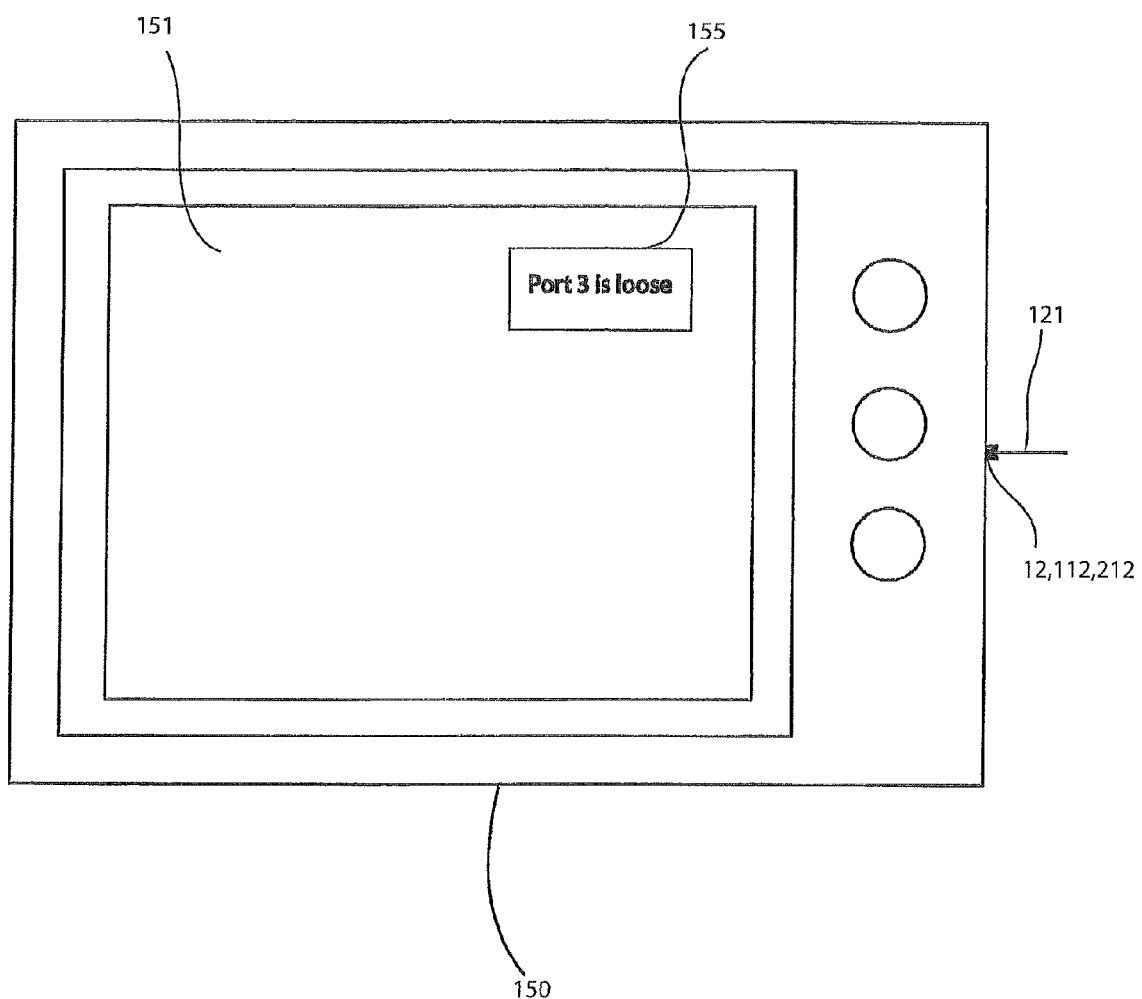
FIG. 10 depicts a device of the premise distribution system displaying a visual alert in accordance with an embodiment of the present invention.

In one embodiment, the condition responsive device 100 may further include a means for sending a response signal to the device 101 of the coaxial cable communication system, the response signal, such as the signals 4, 5, initiating an alert mechanism of the device. It should be understood that the response signals 4, 5 may or may be the same signals sent to the connector 12, 112, 212, as described above. For example, the response signal 4, 5 may be sent through the connector 12, 112, 212, to the device 101, without being received by the input component 300. This means for sending the response signal 4, 5 may be provided by a transmitter 304 configured to send the response signal 4, 5 to the device 101 of the coaxial cable communication system when the processing circuit 303 determines that there is a problem in the connection of the coaxial connector 12, 112, 212 with the port 15. The response signal 4, 5 may initiate an alert 155 operably manifest through the device 101. It should be understood that the transmitter 304 may be configured to send a signal to a device of any party, such as the head end or supplier 20, or a device of the subscriber 21. The response signal may provide a visual display alert 155 on a screen 151 of the television 150, as depicted in FIG. 10. In this case, the television screen 151 may display an alert 155 on a corner of the screen 151 that would notify a watcher of the television 150 that a connection in the coaxial cable communications system has a particular problem. It should be understood that the alert 155 may or may not pertain to the connection of the device actually displaying the alert 155. For example, the alert 155 may be displayed on the screen 151 of the television 150, but pertain to the coaxial cable connection associated with a desktop computer 160. The alert 155 may include information regarding the particular problem that the response was generated for. For example, the alert 155 may include information regarding which connector or port has a problem in the premise distribution system 130. The alert 155 may also include further information about the problem in the connection, such as specifying that the connection is loose, or that there is moisture in the connection.

Alternately, this response signal may provide a visual display or alert 155 on a screen of the computer 160 or the laptop 180. It is also contemplated that the condition responsive premise device 100 may initiate an email alert 155 response signal to the computer 160 or laptop 180. Thus, if the any port, such as the port 15 within the premise distribution system 130 has a connection with a loose connector 12, 112, 212, the condition responsive device 100 may initiate an email alert 155 response to the computer 160 or laptop 180. Furthermore, the alert 155 may not be visual, but instead be an audible alert 155. For example, the alert 155 may be a communication in the form of an automated telephone call to the telephone 170.

The physical parameter status signal, such as the signal 2, 2b, sent by the connector 12, 112, 212 may include an error code (not shown) pertaining to a particular problem in the connection of the coaxial connector 12, 112, 212 with the port 15. In this embodiment, the connector 12, 112, 212 may be pre-programmed to identify particular error codes associated with problems in the connection that the connector 12, 112, 212 senses. Likewise, the processing circuit 303 may be pre-programmed to recognize these codes and initiate an appropriate response. The storage unit 302 may be configured to store any of the physical parameter status signals sent by the connector 12, 112, 212, including any error codes. The storage unit 302 may be configured to store other information associated with the code, such as the time and date the code was received. The storage unit 302 may thereby contain a log of any of the error codes or other physical parameter status signals received by the condition responsive device 100. The data contained in the storage unit 302 may be accessed by service providers, or suppliers 20, in order to critically analyze the functionality of the coaxial cable communication network. The head end, service provider, home office, or supplier 20 may access the storage unit 302 by physically connecting a reader device to the condition responsive device 100. Alternately, the head end, service provide, home office, or supplier 20 may send an inquiry signal to the condition responsive device 100 in order to access the data stored in the storage unit 302. It should be understood that the condition responsive device 100 may be equipped with an encryption mechanism that requires the service provider or supplier 20 to provide a correct password to access any data stored in the storage unit 302.

The error code sent by the connector 12, 112, 212 may be sent at predetermined time intervals. For example, the connector 12, 112, 212 may be configured to send an error code once every 10 minutes or once every day. The predetermined time intervals may vary depending on the condition that the error code pertains to. For example, a more urgent problem in the connection, or a problem that creates a greater amount of upstream noise, may have a shorter predetermined time interval. Likewise, a less severe problem may have a longer predetermined time interval. In any case, the storage unit 302 may be configured to store each of these error codes, as described hereinabove.

The transmitter 304 may further be configured to send a graduated response signal 4, 5 when the processing circuit 303 determines the problem in the connection of the coaxial cable connector 12, 112, 212 with the port 15 persists. A persisting problem may, for example, remain for multiple predetermined time intervals. In that case, the response signal 4, 5 may become increasingly intrusive the longer the problem persists. For example, the first response signal 4, 5 sent by the transmitter 304 may be an LED connected to one of the devices 100, 140, 150, 160, 170, 180, 190, or to the problematic connector 12, 112, 212. If the problem persists for a series of predetermined time intervals without effectively alerting the subscriber 21, the transmitter 304 may be configured to send an alert 155 message to the screen of the television 160, as described hereinabove. If this problem still continues, the transmitter 304 may graduate to a more intrusive response like, for example, an email to the subscriber 21. Furthermore, the transmitter 304 may initiate a telephone call to the telephone 170 of the subscriber 21. The telephone call may leave an automated message to the subscriber 21 containing information regarding the problematic connection.

The condition responsive device 100 may also be in communication with other devices outside the premise distribution system 130. For example, the condition responsive device 100 may be in communication upstream with the supplier 20 at, for example, a home office or head end of the supplier 20. The condition responsive device 100 may be configured to alert a device at the home office of the supplier 20, in the same manner described hereinabove with respect to the alerting of the subscriber 21. In the case of a graduated response, the condition responsive device 100 may resort to alerting the supplier 20 of the problem if the problem persists for a predetermined number of time intervals. Once alerted, for example by an email alert 155, or some other alert 155, the service provider or supplier 20 may send an inquiry to obtain any of the data stored in the storage unit 302. Additionally, the supplier 20 may call the subscriber 21 to set up an appointment if the supplier determines, for example, that an appointment to fix the problem would be appropriate.

It should be understood that the connector 12, 112, 212 may be configured to send the physical parameter status signal wirelessly to the condition responsive device 100. Thus, the receiver 300 of the condition responsive premise device may be a wireless receiver configured to receive wireless signals. Likewise, the transmitter 304 may be configured to send wireless signals to alert the subscriber 21 or the supplier 20. Furthermore, the circuit 305 is shown in FIG. 4 to include the interconnected receiver 301, storage unit 302, processing circuit 303, and transmitter 304. It should be understood that this is a symbolic representation of the circuit 205 and is not meant to denote any particular interrelation of the elements 301, 302, 303, 304, other than to denote that the elements may each be provided in the condition responsive device 100. The elements may include any number of circuitry components, the relations of which will be apparent to those skilled in the art.

Another embodiment of the present invention includes a method for monitoring a coaxial cable communication system. The method comprises first receiving a physical parameter status signal, such as the signal 2, 2b from a coaxial connector 12, 112, 212 connected to a monitored port 15 of the coaxial cable communication system. The physical parameter status signal 2, 2b contains data pertaining to a condition of the connection. The method may further include storing the data pertaining to the condition of the coaxial connector 12, 112, 212. The method also includes determining whether a response signal, such as the signal 4, 5, is appropriate, the response signal 4, 5 being appropriate if there is a problem in the connection of the coaxial connector with the port. Furthermore the method includes transmitting the response signal 4, 5 to a device, such as one of the devices 100, 140, 150, 160, 170, 180, 190 the response signal 4, 5 configured to alert a party of the problem, such as the head end or the subscriber 21. The method may further include analyzing the data to determine whether a bandwidth adjustment is appropriate based on a comparison with a predetermined set of parameters and thereafter adjusting bandwidth in the CATV system. It should be understood that the transmitting of the response may be done wirelessly according to the method of the present invention. Furthermore, the method may include transmitting a graduated response to a device, the graduated response configured to alert the subscriber 21 of problem. The graduated response may also get more intrusive the longer the problem persists. Furthermore, the method may include sending, by the party, a notification to a subscriber 21 when the party is alerted of the problem.

Figure 11:
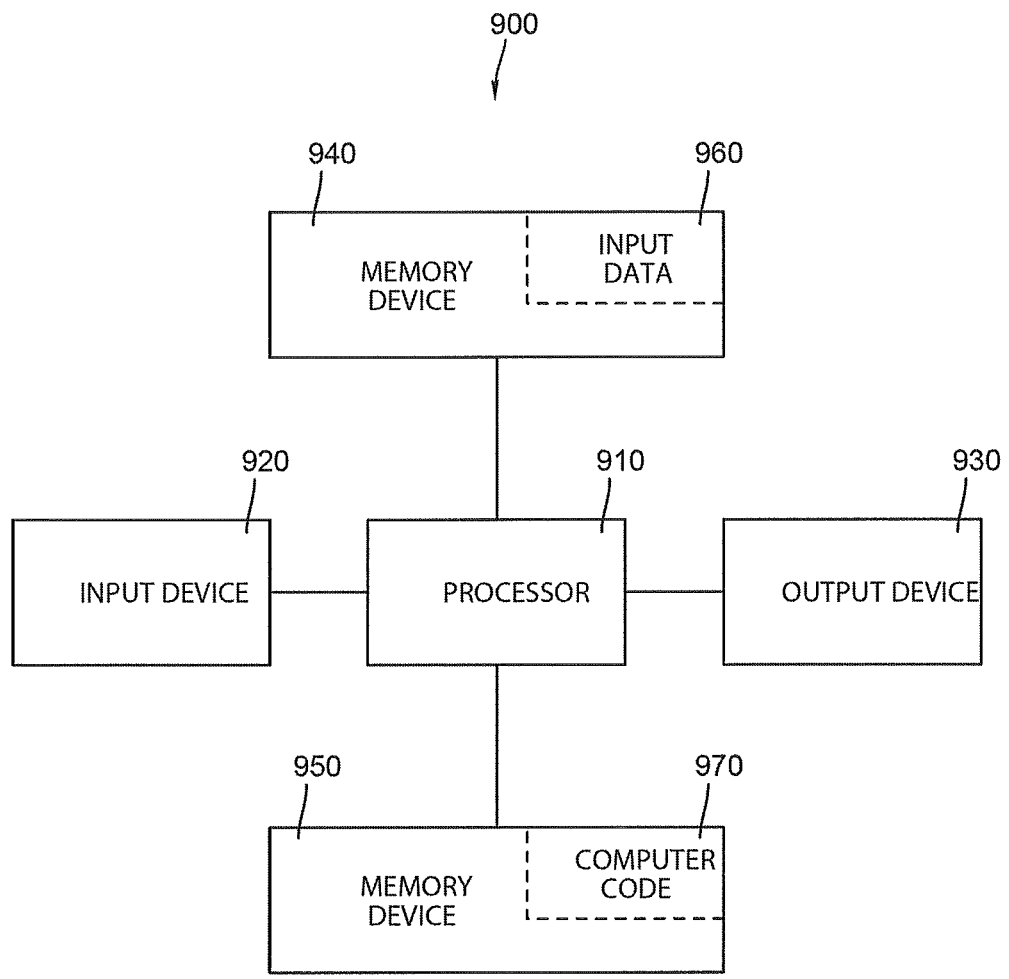
FIG. 11 depicts a computer system in accordance with an embodiment of the present invention.

FIG. 11 illustrates a computer system 900 (examples of which may be various embodiments of condition responsive device 100 FIGS. 1, 2, 8 and 9) used for performing a method or process for monitoring a communication system, in accordance with embodiments of the present invention. The computer system 900 may comprise a processor 910, an input device 920 coupled to the processor 910, an output device 930 coupled to the processor 910, and memory devices 940 and 950 each coupled to the processor 910. The input device 920 may be, among other things, a keyboard, a mouse, etc. The output device 930 may be, among other things, a printer, a plotter, a computer screen, a magnetic tape, a removable hard disk, a floppy disk, etc. The memory devices 940 and 950 may be, among other things, a hard disk, a floppy disk, a magnetic tape, an optical storage such as a compact disc (CD) or a digital video disc (DVD), a dynamic random access memory (DRAM), a read-only memory (ROM), etc. The memory device 950 may include a computer code 970. The computer code 970 includes algorithms or a predetermined set of parameters for performing a process for monitoring a communication system. The processor 910 may execute the computer code 970. The memory device 940 may include input data 960. The input data 960 includes input required by the computer code 970. The output device 930 displays output from the computer code 970. Either or both memory devices 940 and 950 (or one or more additional memory devices not shown in FIG. 11) may comprise the algorithm or predetermined parameters and may be used as a computer usable medium (or a computer readable medium or a program storage device) having a computer readable program code embodied therein and/or having other data stored therein, wherein the computer readable program code comprises the computer code 970. Generally, a computer program product (or, alternatively, an article of manufacture) of the computer system 900 may comprise said computer usable medium (or said program storage device).

While FIG. 11 shows the computer system 900 as a particular configuration of hardware and software, any configuration of hardware and software, as would be known to a person of ordinary skill in the art, may be utilized for the purposes stated herein in conjunction with the particular computer system 900 of FIG. 11. For example, the memory devices 940 and 950 may be portions of a single memory device rather than separate memory devices.

It should be noted that the block diagrams in FIGS. 1, 2, 3, 7, and 9 illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagram illustrations, can be implemented by special purpose hardware-based systems that perform the specified functions or acts, or combinations of special purpose hardware and computer instructions.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A condition responsive device for connection with a communication system, the device comprising:
    a receiver configured to receive a physical parameter status signal from a smart connector of the communication system, the smart connector having a first circuit configured to execute logic to generate the physical parameter status signal, the physical parameter status signal containing data pertaining to a condition associated with the smart connector; and
    a second circuit configured to analyze the data to determine whether a communications signal adjustment is appropriate, wherein the second circuit is configured to initiate a communications signal adjustment in the communication system in response to the determination that the communications signal adjustment is appropriate, wherein the communications signal adjustment is operable to modify the condition of a monitored port associated with the smart connector.

2. The condition responsive device of claim 1, wherein the second circuit is a microprocessor.

3. The condition responsive device of claim 1, wherein the physical parameter status signal is sent wirelessly from the smart connector.

4. The condition responsive device of claim 1, wherein the condition relates to a connection of the smart connector to a monitored port, and the second circuit is configured to analyze the data to determine if there is a problem.

5. The condition responsive device of claim 4, further comprising a transmitter configured to send a response signal to a second device of the communication system when the second circuit determines that there is a problem in the connection of the smart connector with the monitored port, the response signal initiating an alert display of the second device.

6. The condition responsive device of claim 5, wherein the transmitter is configured to send the response signal to the second device wirelessly.

7. The condition responsive device of claim 5, wherein the second device is a television and the response signal initiates a message displayed on a screen of the television.

8. The condition responsive device of claim 4, further comprising a transmitter configured to send a response signal to a head end after the second circuit determines that the problem occurs.

9. The condition responsive device of claim 4, further comprising a transmitter configured to send a graduated response after the second circuit determines that the problem persists.

10. The condition responsive device of claim 9, wherein the graduated response becomes increasingly intrusive the longer the problem persists.

11. The condition responsive device of claim 1, wherein the physical parameter status signal corresponds with an error code, the error code pertaining to a particular problem in a connection of the smart connector with a port.

12. The condition responsive device of claim 11, wherein the error code is sent by the smart connector once every predetermined time interval, wherein a storage unit is configured to store a plurality of the error codes.

13. The condition responsive device of claim 1, wherein the communications signal adjustment comprises an adjustment selected from the group consisting of increasing the signal attenuation, shutting down an unused return path leg, amplification, filtering and equalization.

14. The condition responsive device of claim 1, wherein the communications system is a CATV system.

15. A condition responsive device for connection with a communications system, the device comprising:
    a means for receiving a physical parameter status signal from a smart connector of the communications system, the smart connector having a means for executing logic to generate the physical parameter status signal, the physical parameter status signal containing data pertaining to a condition associated with the smart connector;
    a means for determining whether a response signal is appropriate, the determination being based on whether there is a problem with connectivity of the smart connector with a monitored port; and
    a means for sending the response signal to a second device of the communications system, the response signal initiating an alert generated by the second device, wherein a communications signal adjustment is operable to modify the condition of the monitored port associated with the smart connector.

16. The condition responsive device of claim 15, further comprising a means for storing data sent by the smart connector.

17. The condition responsive device of claim 15, further comprising a means for analyzing the data to determine whether the communications signal adjustment is appropriate.

18. A method of monitoring a communication system comprising:
    receiving a physical parameter status signal from a smart connector of a communications system, the smart connector having a circuit configured to execute logic to generate the physical parameter status signal, the physical parameter status signal containing data pertaining to a condition associated with the smart connector;
    storing the data pertaining to the condition;
    determining whether a response signal is appropriate by determining whether there is a problem with connectivity of the smart connector with a monitored port; and transmitting the response signal to a device of the communication system, the response signal configured to alert a party of the problem, wherein a communications signal adjustment is operable to modify the condition of a monitored port associated with the smart connector.

19. The method of claim 18, further comprising analyzing the data to determine whether a bandwidth adjustment is appropriate based on a comparison with a predetermined set of parameters.

20. The method of claim 18, further comprising transmitting the response signal wirelessly.

21. The method of claim 18, further comprising transmitting a graduated response to the device, the graduated response configured to alert a subscriber of the problem.

22. The method of claim 21, wherein the graduated response gets increasingly intrusive the longer the problem persists.

23. The method of claim 18, further including sending, by the party, a notification to a subscriber when the party is alerted of the problem.

24. The method of claim 23, wherein the party is a head end.

25. A condition responsive device for connection with a communication system, the device comprising:
 a receiver configured to receive a physical parameter status signal from a smart connector of the communication system, the smart connector having a first circuit configured to execute logic to generate the physical parameter status signal, the physical parameter status signal containing data pertaining to a condition associated with the smart connector;
 a storage unit configured to store the data;
 a second circuit configured to analyze the data to determine whether a response signal is appropriate by determining whether there is a problem with connectivity of the smart connector with a monitored port; and
 a transmitter configured to send the response signal to a second device of the communication system, the response signal initiating an alert generatable by the second device, wherein a communications signal adjustment is operable to modify the condition of the monitored port associated with the smart connector.

26. The condition responsive device of claim 25, wherein the second circuit is a microprocessor.

27. The condition responsive device of claim 25, wherein the second circuit is configured to analyze the data to determine whether the communications signal adjustment is appropriate.

28. The condition responsive device of claim 25, wherein the second circuit is configured to initiate adjustment of bandwidth in the communication system after the second circuit determines that adjustment is appropriate.

29. The condition responsive device of claim 25, wherein the communications signal adjustment comprises an adjustment selected from the group consisting of increasing the signal attenuation, shutting down an unused return path leg, amplification, filtering and equalization.

30. The condition responsive device of claim 25, wherein the physical parameter status signal is sent wirelessly from the smart connector.

31. The condition responsive device of claim 25, wherein the condition is selected from the group consisting of tightness, pressure, moisture, temperature, amperage, voltage, signal level, signal frequency, impedance, return path activity, connection location, service type, installation date, previous service call dates, and serial number.

32. The condition responsive device of claim 25, wherein the second device is a television and the response signal initiates a message displayed on a screen of the television.

33. The condition responsive device of claim 25, wherein the physical parameter status signal corresponds with an error code, the error code pertaining to a particular problem in a connection of the smart connector with the monitored port.

34. The condition responsive device of claim 33, wherein the error code is sent by the smart connector once every predetermined time interval, wherein the storage unit is configured to store a plurality of the error codes.

35. The condition responsive device of claim 25, wherein the transmitter is configured to send a response signal to a home office after the second circuit determines that there is a problem in a connection of the smart connector with the monitored port.

36. The condition responsive device of claim 25, wherein the transmitter is configured to send a graduated response after the second circuit determines that the problem in a connection of the smart connector with the monitored port persists.

37. The condition responsive device of claim 36, wherein the graduated response becomes increasingly intrusive the longer the problem persists.

38. The condition responsive device of claim 25, wherein the communications system is a CATV system.

39. The condition responsive device of claim 1, wherein the first circuit includes a memory device, the memory device storing the logic.

40. The condition responsive device of claim 1, wherein the first circuit includes a sensing circuit having a logic control unit, the sensing circuit including at least one sensor operative to sense the physical parameter of the connector and the logic control unit operative to execute logic pertaining to connector functionality.

41. The condition responsive device of claim 1, wherein the sensing circuit is configured to be electrically connected to a center conductor of the connector to energize the sensing circuit.

42. The condition responsive device of claim 41, wherein the physical parameter status signal is generated automatically at regulated time intervals.

43. The condition responsive device of claim 18, wherein the circuit includes a memory device, the memory device storing the logic.

44. The condition responsive device of claim 18, wherein the circuit includes a sensing circuit having a logic control unit, the sensing circuit including at least one sensor operative to sense the physical parameter of the connector and the logic control unit operative to execute logic pertaining to connector functionality.

45. The condition responsive device of claim 25 wherein the first circuit includes a sensing circuit having a logic control unit, the sensing circuit including at least one sensor operative to sense the physical parameter of the connector and the logic control unit operative to execute logic pertaining to connector functionality.

46. The condition responsive device of claim 25 wherein the first circuit includes a memory device, the memory device storing the logic.

47. The condition responsive device of claim 45, wherein the sensing circuit is configured to be electrically connected to a center conductor of the connector to energize the sensing circuit.

48. The condition responsive device of claim 47, wherein the physical parameter status signal is generated automatically at regulated time intervals.

49. The condition responsive device of claim 48, wherein the sensing circuit is configured to be electrically connected to a center conductor of the connector to energize the sensing circuit.

50. The condition responsive device of claim 49 wherein the physical parameter status signal is generated automatically at regulated time intervals.

51. A condition responsive device comprising:
- a receiver configured to receive a physical parameter status signal from a smart connector which is electrically coupled to a communication system, the smart connector storing logic configured to automatically generate the physical parameter status signal, the physical parameter status signal containing data pertaining to a function of the smart connector; and
- a circuit configured to determine whether an adjustment is appropriate based on the data and initiate a command in the communication system in response to the determination, the command being operable to cause the function of a monitored port associated with the smart connector to be modified.

52. The condition responsive device of claim 51, wherein the smart connector has a memory device which stores logic, and the smart connector has a connector circuit which is operable to execute the logic.

53. The condition responsive device of claim 51, wherein the circuit is configured to analyze the data to determine whether the response signal is appropriate, the response signal being appropriate based on a determination that there is a problem with connectivity of the smart connector to a monitored port.

54. The condition responsive device of claim 52, further comprising a transmitter configured to send the response signal to a device of the communication system, the response signal initiating an alert display of the second device.

55. The condition responsive device of claim 54, wherein the transmitter is configured to send the response signal to the device wirelessly.

56. The condition responsive device of claim 55, wherein the device is a television and the response signal initiates a message displayed on a screen of the television.

* * * * *